(12) United States Patent
Pope et al.

(10) Patent No.: US 7,277,506 B1
(45) Date of Patent: Oct. 2, 2007

(54) MAXIMUM LIKELIHOOD SEQUENCE ESTIMATOR WHICH COMPUTES BRANCH METRICS IN REAL TIME

(75) Inventors: Stephen P. Pope, Berkeley, CA (US); Aki Shohara, Sunnyvale, CA (US); Yuo Chen, Fremont, CA (US); Bryan Chase, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 500 days.

(21) Appl. No.: 09/636,000

(22) Filed: Aug. 9, 2000

Related U.S. Application Data

(60) Provisional application No. 60/147,506, filed on Aug. 9, 1999.

(51) Int. Cl.
*H04L 27/06* (2006.01)
*H03D 1/00* (2006.01)
(52) U.S. Cl. .................................. 375/341
(58) Field of Classification Search ............. 375/341, 375/340, 316, 324
See application file for complete search history.

(56) References Cited

U.S. PATENT DOCUMENTS

| | | | | |
|---|---|---|---|---|
| 5,375,129 A | | 12/1994 | Cooper | 371/43 |
| 5,440,588 A | * | 8/1995 | Murakami | 375/341 |
| 5,502,735 A | * | 3/1996 | Cooper | 714/794 |
| 5,687,352 A | * | 11/1997 | Beat | 711/154 |
| 5,721,746 A | * | 2/1998 | Hladik et al. | 714/792 |
| 5,844,947 A | * | 12/1998 | Cesari | 375/341 |
| 5,974,091 A | * | 10/1999 | Huff | 375/265 |
| 6,035,428 A | * | 3/2000 | Jekal | 714/702 |

OTHER PUBLICATIONS

U.S. Appl. No. 60/147,506; Shohara et al, filed Aug. 9, 1999.*
Schwartz, Information, Transmission, Modulation, and Noise, 1990, McGraw-Hill, Fourth Edition, pp. 112-120.*
Forney G.D., "Maximum-Likelihood Sequence Estimation of Digital Sequences in the Presence of Intersymbol Interference," *IEEE Transactions on Information Theory*, IT-18:363-378 (1972).
Forney, G.D., "The Viterbi Algorithm," *Proceedings of the IEEE*, 619(3):268-277 (1973).
Viterbi, A.J., "Error Bounds For Convolutional Codes and an Asymptotically Optimum Decoding Algorithm," *IEEE transactions on Information Theory*, IT-13(2):260-269 (1967).
Ungerboeck, G., "Adaptive Maximum-Likelihood Receiver for Carrier-Modulated Data-Transmission Systems," *IEEE Transactions on Communications*, COM-22(5):624-636 (1974).

(Continued)

*Primary Examiner*—Kevin Burd

(57) ABSTRACT

An improved method and apparatus for Viterbi Algorithm calculations for maximum likelihood sequence estimators in communication receivers is disclosed. The calculations for the maximum likelihood sequence estimator, in accordance with the invention, utilizes a variant of the Viterbi algorithm developed by Ungerboeck in which the associated branch metric calculations for the trellis require the computation of a set of branch metric parameters. An embodiment of the present invention provides for an improved recursive method and apparatus for calculation of the branch metric parameters that reduces the number of processor clock cycles required per state metric calculation. This enables real time computation of the branch metric parameters during execution of the Viterbi Algorithm.

21 Claims, 11 Drawing Sheets

OTHER PUBLICATIONS

Joachim, Hagenauer, et al., "A Viterbi Algorithm with Soft-Decision Outputs and its Applications", in Proc. IEEE Global Telecommunications Conference 1989, Dallas, Texas, (Nov. 1989), pp. 1680-1686.

"Digital cellular telecommunications system (Phase 2+); Channel coding", *GSM 05.03 version 8.2.0 Release 1999*, (1999).

"Digital cellular telecommunications system (Phase 2+); Channel coding", *GSM 05.03 version 7.2.0 Release 1998*, (1999).

"Digital cellular telecommunications system (Phase 2+); Modulation", *GSM 05.04 version 8.1.0 Release 1999*, (1999).

"Digital cellular telecommunications system (Phase 2+); Modulation", *GSM 05.04 version 7.1.0 Release 1998*, (2000).

"Digital cellular telecommunications system (Phase 2+); Multiplexing and multiple access on the radio path", *GSM 05.02 version 8.2.0 Release 1999*, (2000).

"Digital cellular telecommunications system (Phase 2+); Multiplexing and multiple access on the radio path", *GSM 05.02 version 7.3.0 Release 1998*, (2000).

"Digital cellular telecommunications system (Phase 2+); Physical layer on the radio path; General description", *GSM 05.01 version 7.1.0 Release 1998*, (1999).

"Digital cellular telecommunications system (Phase 2+); Physical layer on the radio path; General description"; *GSM 05.01 version 8.2.0 Release 1999*, (1999).

"Digital cellular telecommunications system (Phase 2+); Radio transmission and reception", *GSM 05.05 version 8.2.0 Release 1999*, (1999).

"Digital cellular telecommunications system (Phase 2+); Radio transmission and reception", *GSM 05.05 version 7.2.0 Release 1998*, (1999).

\* cited by examiner

| n | $q_n$ | $F(q_n,0)$ | $F(q_n,1)$ |
|---|---|---|---|
| 0 | 00000 | $s$ | $F(q_n,0)-2s_5$ |
| 1 | 00001 | $F(q_{n-1},0)-2s_1$ | $F(q_n,0)-2s_5$ |
| 2 | 00011 | $F(q_{n-1},0)-2s_2$ | $F(q_n,0)-2s_5$ |
| 3 | 00010 | $F(q_{n-1},0)+2s_1$ | $F(q_n,0)-2s_5$ |
| 4 | 00110 | $F(q_{n-1},0)-2s_3$ | $F(q_n,0)-2s_5$ |
| 5 | 00111 | $F(q_{n-1},0)-2s_1$ | $F(q_n,0)-2s_5$ |
| 6 | 00101 | $F(q_{n-1},0)+2s_2$ | $F(q_n,0)-2s_5$ |
| 7 | 00100 | $F(q_{n-1},0)+2s_1$ | $F(q_n,0)-2s_5$ |
| 8 | 01100 | $F(q_{n-1},0)-2s_4$ | $F(q_n,0)-2s_5$ |
| 9 | 01101 | $F(q_{n-1},0)-2s_1$ | $F(q_n,0)-2s_5$ |
| 10 | 01111 | $F(q_{n-1},0)-2s_2$ | $F(q_n,0)-2s_5$ |
| 11 | 01110 | $F(q_{n-1},0)+2s_1$ | $F(q_n,0)-2s_5$ |
| 12 | 01010 | $F(q_{n-1},0)+2s_3$ | $F(q_n,0)-2s_5$ |
| 13 | 01011 | $F(q_{n-1},0)-2s_1$ | $F(q_n,0)-2s_5$ |
| 14 | 01001 | $F(q_{n-1},0)+2s_2$ | $F(q_n,0)-2s_5$ |
| 15 | 01000 | $F(q_{n-1},0)+2s_1$ | $F(q_n,0)-2s_5$ |
| 16 | 10000 | $-s$ | $F(q_n,0)+2s_5$ |
| 17 | 10001 | $F(q_{n-1},0)+2s_1$ | $F(q_n,0)+2s_5$ |
| 18 | 10011 | $F(q_{n-1},0)+2s_2$ | $F(q_n,0)+2s_5$ |
| 19 | 10010 | $F(q_{n-1},0)-2s_1$ | $F(q_n,0)+2s_5$ |
| 20 | 10110 | $F(q_{n-1},0)+2s_3$ | $F(q_n,0)+2s_5$ |
| 21 | 10111 | $F(q_{n-1},0)+2s_1$ | $F(q_n,0)+2s_5$ |
| 22 | 10101 | $F(q_{n-1},0)-2s_2$ | $F(q_n,0)+2s_5$ |
| 23 | 10100 | $F(q_{n-1},0)-2s_1$ | $F(q_n,0)+2s_5$ |
| 24 | 11100 | $F(q_{n-1},0)+2s_4$ | $F(q_n,0)+2s_5$ |
| 25 | 11101 | $F(q_{n-1},0)+2s_1$ | $F(q_n,0)+2s_5$ |
| 26 | 11111 | $F(q_{n-1},0)+2s_2$ | $F(q_n,0)+2s_5$ |
| 27 | 11110 | $F(q_{n-1},0)-2s_1$ | $F(q_n,0)+2s_5$ |
| 28 | 11010 | $F(q_{n-1},0)-2s_3$ | $F(q_n,0)+2s_5$ |
| 29 | 11011 | $F(q_{n-1},0)+2s_1$ | $F(q_n,0)+2s_5$ |
| 30 | 11001 | $F(q_{n-1},0)-2s_2$ | $F(q_n,0)+2s_5$ |
| 31 | 11000 | $F(q_{n-1},0)-2s_1$ | $F(q_n,0)+2s_5$ |

Fig. 7

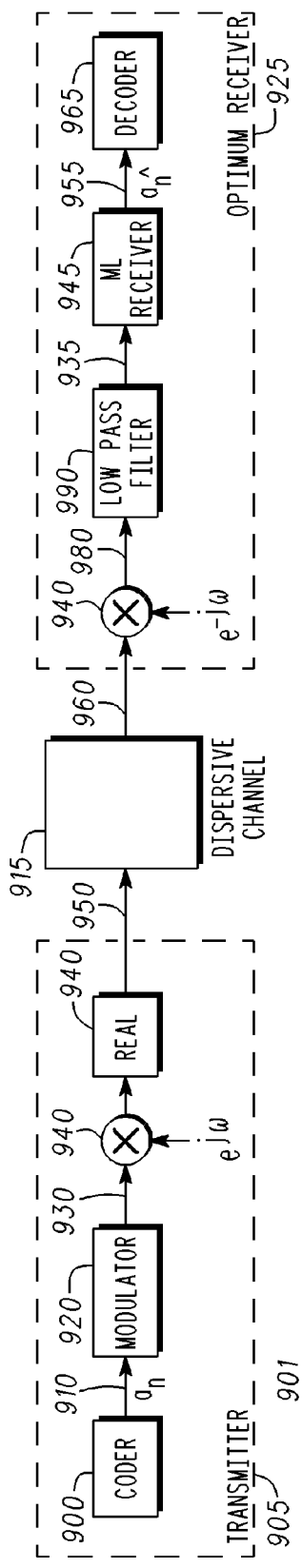
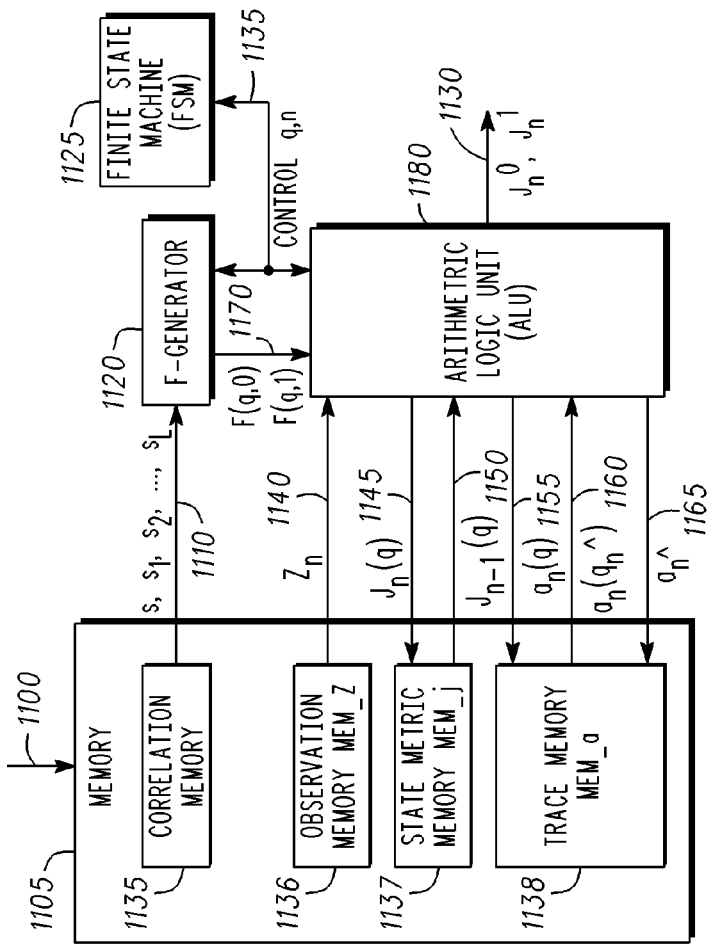
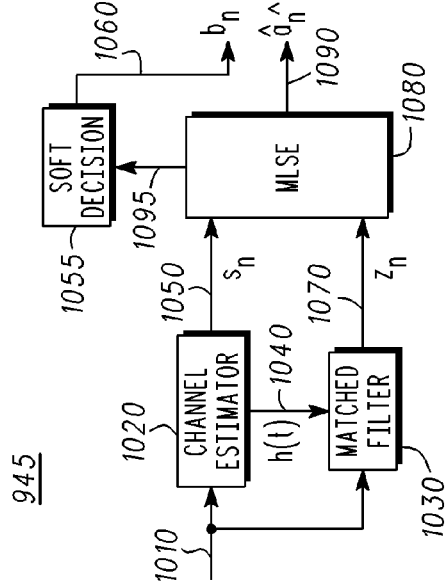

MAXIMUM LIKELIHOOD SEQUENCE ESTIMATOR WHICH COMPUTES BRANCH METRICS IN REAL TIME

CROSS-REFERENCES TO RELATED APPLICATIONS

This application claims priority to provisional application Ser. No. 60/147,506, filed Aug. 9, 1999.

The present invention relates to maximum likelihood sequence estimators utilized by receivers in communications systems to mitigate intersymbol interference in digital data propagation caused by dispersive communication channels.

BACKGROUND OF THE INVENTION

A well known problem in communication systems is intersymbol interference induced on a digital communication waveform by the dispersive properties of a transmission channel.

In most wireless communication systems, a transmitter will radiate its output signal in all directions. This radiated data can reflect off buildings, windows, and other surfaces. A receiver will therefore receive data from the transmitter which has traveled in a variety of routes. For example, an individual symbol of data may reach the receiver by traveling in a straight line, and may also reach it by reflecting from a building, and may further reach the receiver by first reflecting from a body of water, then off a different building. This will mean that the same symbol will travel from transmitter to receiver by three paths. This phenomena us referred to as multipath.

The result of this multipath effect is that each symbol is in effect smudged in time, and each symbol sent by the transmitter blurs into adjacent symbols. Therefore, the received waveform at any given time is dependent on some number of previous symbols. This is known as intersymbol interference. Furthermore, this multipath effect, as well as other effects, are what causes dispersion in the channel.

A class of equalizers, known as Maximum Likelihood Sequence Estimators (MLSE) has been developed to correct for this intersymbol interference. Many of this type of equalizer have incorporated what is known as the Viterbi Algorithm for use in determining the most likely sequence. This Algorithm is however, very computationally intensive, and requires a great deal of memory which must be integrated onto a VLSI chip designed to include an MLSE. Embodiments of the present invention provide improvements to an MLSE resulting in reduced memory requirements, simpler computational complexity, and improved accuracy. These improvements lead to reduced power consumption, smaller die size for the VLSI circuit.

SUMMARY OF THE INVENTION

One embodiment of the present invention provides for real time computation of the branch metrics used in the partial path metric decisions made during the forward trace through the trellis.

Another embodiment of the present invention provides for the use of Gray coding of states to reduce the computations required to calculate the branch metrics at each node of the trellis.

A further embodiment of the present invention makes use of known initial and final states of the trellis to improve MLSE accuracy. An enhancement to this embodiment further uses knowledge of invalid bits in the initial and final states.

BRIEF DESCRIPTION OF THE DRAWINGS

FIG. 7 is a tabular example of the recursive method of computation of branch metric parameters $F(q,0)$ and $F(q, 1)$ by the F-Generator according to the present invention;

FIG. 9 is a block diagram describing a general linear carrier modulated data transmission system;

FIG. 10 is a block diagram of the ML receiver;

FIG. 11 is a block diagram showing an overview of the MLSE computational method according to the present invention;

Table 1 shows the ALU and F-Generator processing steps for one embodiment of the present invention;

Table 2 shows the required number of clock cycles needed by the ALU for one embodiment;

Table 3 shows the memory requirement;

Table 4 shows the register contents regarding the initial and final states of a trellis for the GSM standard; and Table 5 shows the ALU and F-Generator processing steps for another embodiment of the present invention.

DESCRIPTION OF THE SPECIFIC EMBODIMENTS

Embodiments of the present invention relate to improvements in MLSEs used in receivers to compensate for intersymbol interference caused by the dispersive nature of transmission channels.

Figure 1:
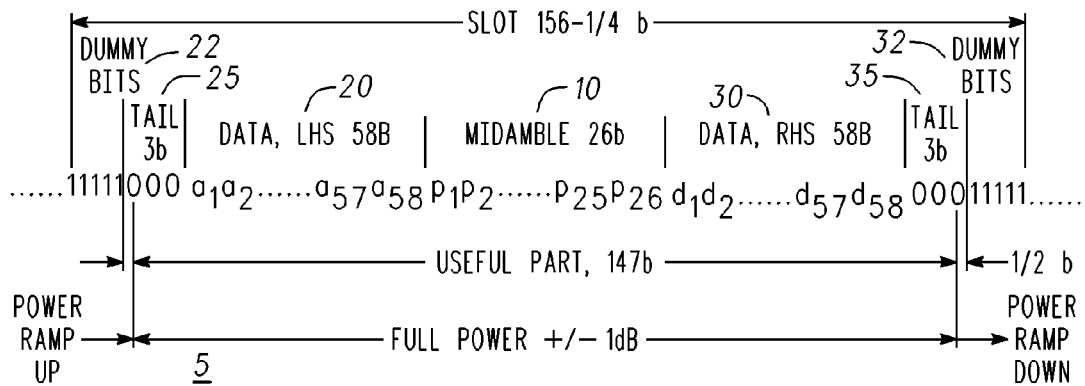
FIG. 1 shows a data burst for the GSM (Global System for Mobile) standard.

FIG. 1 is a diagram of a data burst for the GSM standard. The data burst 5 has two data sections, one on either side of a 26 bit midamble 10. The data sections each are 58 bits in length, and are referred to as the Left Hand Side (LHS) data 20, and the Right Hand Side (RHS) data 30. A series of dummy bits 22, and a tail of 3 zeros 25 precede the LHS data 20. A tail of 3 zeros 35, and a series of dummy bits 32 follow the RHS data. The power ramps up and down while the dummy bits are sent, and the power must be constant to plus or minus 1 dB while the tails 25 and 35, midamble 10, RHS 30, and LHS 20 data are sent.

Once the data burst has been received, the RHS 30 and LHS 20 data may be stored. The midamble 10 is processed to create a model for the channel characteristics that existed when the data burst was sent. The model is made up of a series of L coefficients $S_1, S_2 \ldots s_L$, which are autocorrelation values of the impulse response of the channel. These coefficients will be used below to calculate the branch metrics used in the trellis processing.

Figure 2:
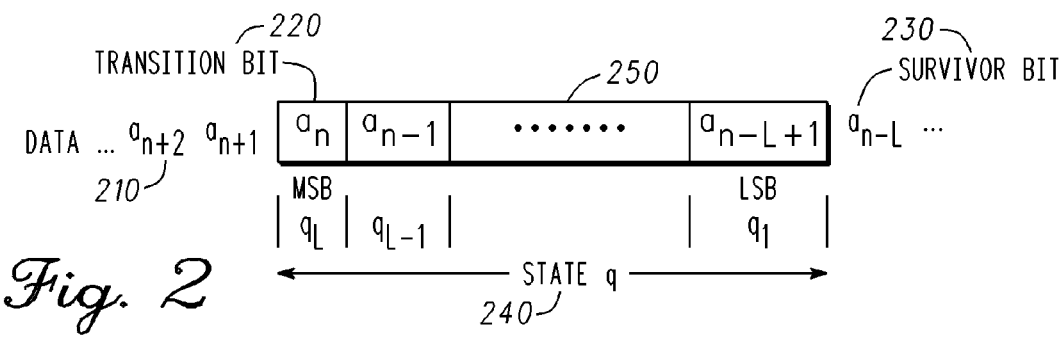
FIG. 2 shows the relationship between the transition bit, the survivor bit, and the present state of the channel.

FIG. 2 shows the relationship between the incoming data 210, the transition bit 220, the survivor bit 230, the present state 240, and the bits in a channel memory of length L 250. The incoming data 210 is the hypothesized transmitted sequence. This sequence will be processed by the MLSE to create the corrected received data sequence. As discussed above, each incoming data bit is smudged, or dispersed into the next several following bits. The length of the dispersion is referred to as the channel memory, which has a length of L. The incoming data 210 can be thought to be passed through a shift register 250 of length L. As data shifts from left to right, the newly incoming bit is the transition bit 220, and is referred to as the MSB, the outgoing bit is the survivor bit 230, and the bits in the shift register 250 form the present state q 240. It is important to note that each present state q 240 has two subsequent states which are possible, depending on whether the next transition bit 220 is a one or a zero. For example, a present state with a length L of 4 bits 0001 has two subsequent states possible; 0000 if the transition bit is a 0, and 1000 if the transition bit is a 1. In either case, the 1 in the LSB position of the present state is shifted out and becomes the survivor bit 230. Put another way, each present state q 240 has two predecessor states, depending on the survivor bit that was shifted out. For example, state 0000 has predecessor states 0000 and 0001, where the survivor bits are 0 and 1 respectively. The survivor bit defines the predecessor state, and is alternately referred to as the predecessor bit.

Figure 3:
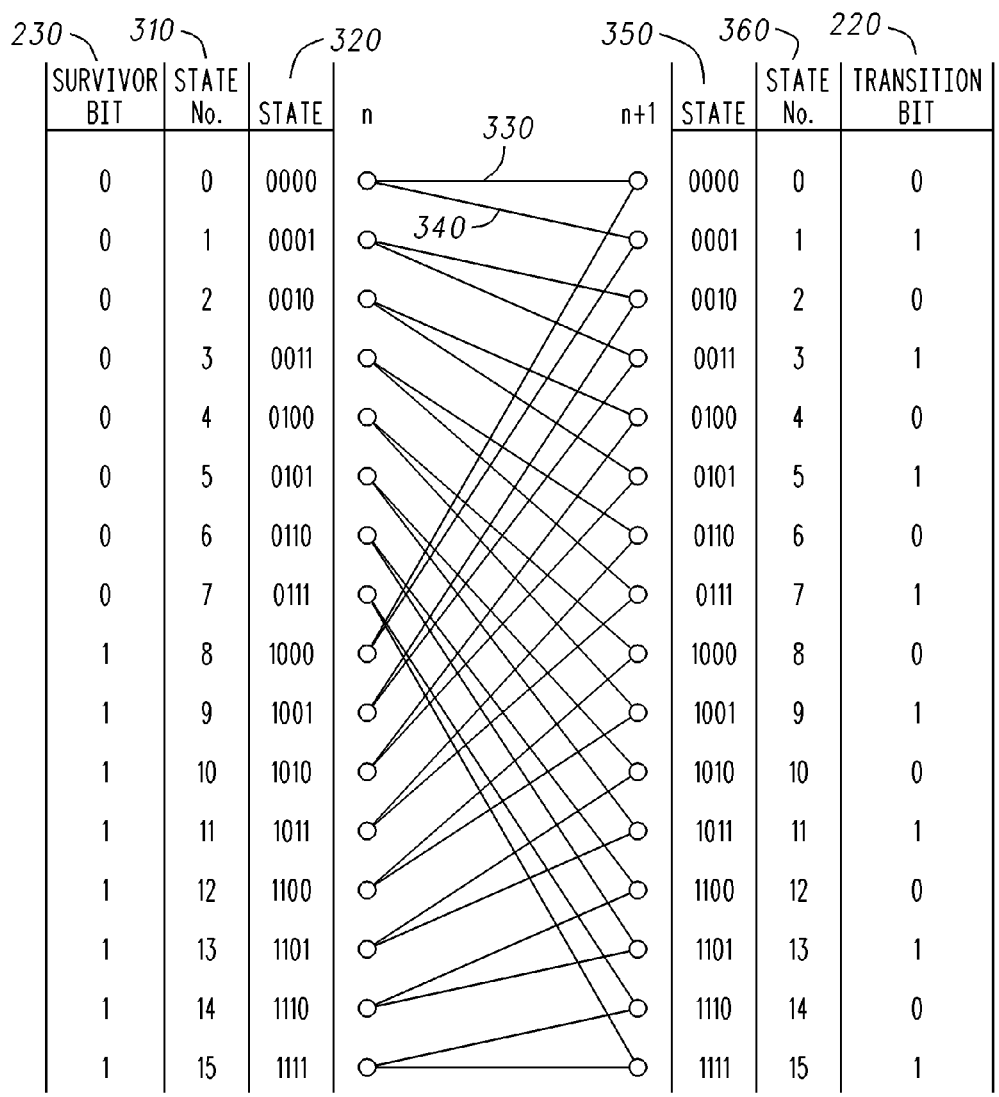
FIG. 3 shows the details between two consecutive stages of the trellis.

FIG. 3 is a diagram showing all possible present states and associated subsequent states for a MLSE having a channel length of L=4. In FIG. 3 the MSB is on the right, and the LSB is on the left. As one example, present state number 0, which is the first row in column 310 has the present state of 0000. If the transition bit is a 0, then the path from the present state to the subsequent state follows branch 330, the survivor bit 230 is a zero, and the subsequent state is 0. If the transition bit is a 1, then the path from the present state to the subsequent state follows branch 340, the survivor bit 230 is a zero, and the subsequent state is 0001. Note that if the MSB is written on the left, this subsequent state is 1000. In this diagram, all $2 \times 2^L$, or 32 branches between the $2^L$, or 16 present states 310, and $2^L$ next states 350 are shown.

Figure 4:
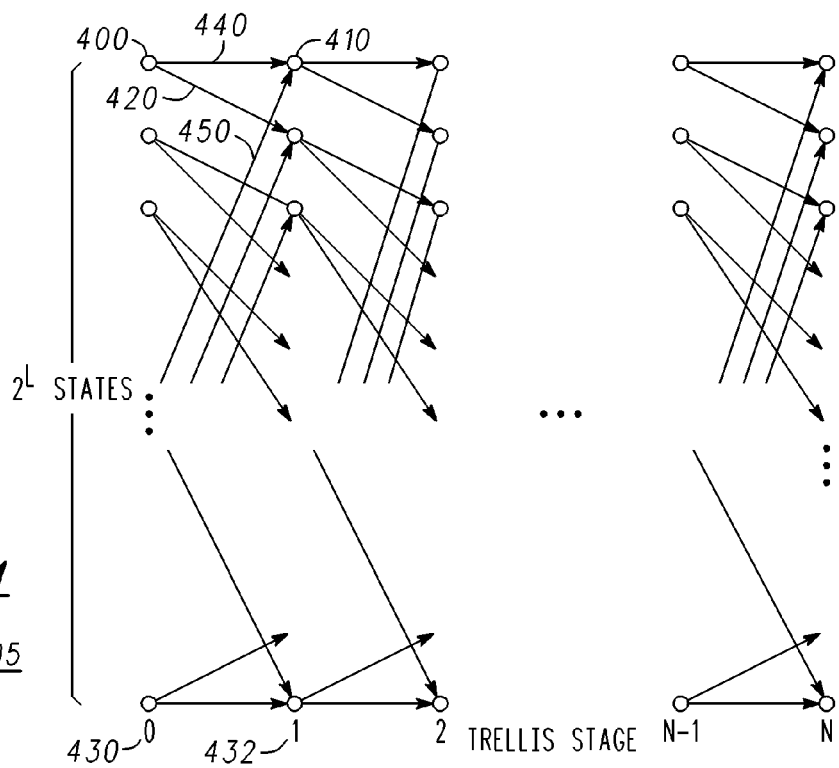
FIG. 4 is a diagram of a trellis used by the MLSE.

FIG. 4 is a diagram of the complete trellis stage 405 used by the MLSE. Each new transition bit shifted into the MLSE represents a new stage 430 in the trellis diagram, from 0 to N. At each stage of the trellis, there are $2^L$ possible states. Each possible state in the trellis is referred to as a node 400. Each node 400 has two branches 440, and 420, leading to nodes in the next stage of the trellis. A generalized example of the paths between two stages such as 430 and 432 was shown in detail in FIG. 3. In the general case, a trellis with symbols from an alphabet of size M will have M branches emanating from, and feeding into each node 400. For example, if M=4, there will be four branches from each node in a trellis stage, that is one branch to 4 different nodes in the subsequent trellis stage. Each node in the subsequent trellis stage would have 4 branches, one from each of 4 nodes in the previous trellis stage. This pattern would hold true for M=8, or any other number.

The Viterbi Algorithm is implemented in one embodiment of the present invention as follows. The path metrics for all states at stage 0 430 of trellis 405 in FIG. 4 are initialized to zero. The branch metrics for each branch 440 leading from each node in stage 0 430 to stage 1 432 in trellis 405 are calculated. The manner in which these are calculated is shown below. The branch metrics are added to the path metric (zero in this case) resulting in a new path metric. For each node (if M=2) in stage 1, there are two incoming branches. For example, node 410 may be reached by branch 440, or 450. Each of these branches are compared to see which has the highest path metric. The higher path metric is stored in memory as the state metric. Also, that branch's survivor bit, is stored in memory. That is to say, for each node in stage 1 of trellis 405, the path metric of one branch (the state metric), and that branch's survivor bit are stored, and one branch's path metric and survivor bit are discarded. This process continues from stage 1 to N. At stage N, all path metrics are compared, and the one with the highest value is stored. This is then the trellis' final state.

Explained another way, for state $q=(q_L, q_{L-1}, \ldots, q_1)$, the predecessor state for predecessor bit 1 is indicated by notation $q\hat{\ }1=(q_{L-1}, q_{L-2}, \ldots q_1, 1)$ and the predecessor state for predecessor bit 0 by $q\hat{\ }0=(q_{L-1}, q_{L-2}, \ldots q_1, 0)$. For each node of the trellis there are two partial paths merging into the node corresponding to predecessor bits 0 and 1 respectively. The partial paths have associated partial path metrics $J_n^0(q)$ and $J_n^1 q$ which indicate the respective likelihood of occurrence. Also, for the two branches merging into the node q there is associated an incremental branch metric $dJ(q,0)$ and $dJ(q,1)$ which are the incremental likelihood respectively of the branches (state transitions) for predecessor bits 0 and 1. A partial path metric is equal to the sum of the respective incremental branch metric and the state metric of the predecessor state of the branch. The Viterbi Algorithm recursively computes the node state metric as equal to the maximum of the two partial path metrics merging into the node. This means that the state metric is equal to the larger of the two partial path metrics of the two paths merging into the node. Among the partial paths merging into the node, the predecessor bit of the partial path with the larger path metric is termed the survivor bit for the node which is stored for each node.

At this point, the forward trace is complete, and the backward trace begins. Beginning with the final stage N, the survivor bit stored in memory which corresponds to the highest state metric at stage N is left shifted into a register (as shown in FIG. 2), which now hold the final state, as the LSB, thus resulting in a new state at the N−1 stage. The survivor bit associated with that state in the N−1 stage is shifted in as the LSB, resulting in the N−2 state. This is then repeated until stage 0 430 is reached. The sequence of MSB bits left shifted out of the register is then the received data, corrected for intersymbol interference. (It may be the reverse of the received data, depending on how the survivor bits were stored as they were read out.)

In other words, at completion of the final stage N, the state $q_N\hat{}$ with the largest metric at stage N represents the terminating state of the maximum likelihood path among all trellis paths. The predecessor state along the maximum likelihood path at stage N−1 is next obtained as follows. For terminating state $q_N\hat{}$ the survivor bit $a_N(q_N\hat{})$ is retrieved from memory. The shift register of FIG. 2 is initialized with the terminating state $q_N\hat{}$. Then the shift register contents are shifted left (toward the MSB) and the survivor bit is shifted into the LSB position of the shift register. The resultant shift register content is the predecessor state $q_{N-1}\hat{}$, and the bit $a_N\hat{}$ shifted out of the MSB position of the shift register on the left is the last symbol of the maximum likelihood sequence estimate. Next the survivor bit $a_{N-1}(q_{N-1}\hat{})$ for state $q_{N-1}\hat{}$, is obtained from forward trace memory and again shifted into the LSB position of the shift register and the shift register content is the next predecessor state $q_{N-2}\hat{}$ on the backward trace along the maximum likelihood path through the trellis. The bit $a_{N-1}$ shifted out of the MSB position is the next symbol of the maximum likelihood data sequence in reverse order. The sequence of survivor bits $a_N(q_N\hat{})$, $a_{N-1}(q_{n-1}\hat{})$ . . . are thus recursively determined and shifted into the LSB position of the shift register and the bits shifted out of the MSB position of the shift register represent the maximum likelihood symbol sequence $a_1\hat{}$, $a_2\hat{}$, . . . , $a_N\hat{}$ in reverse order.

Figure 5:
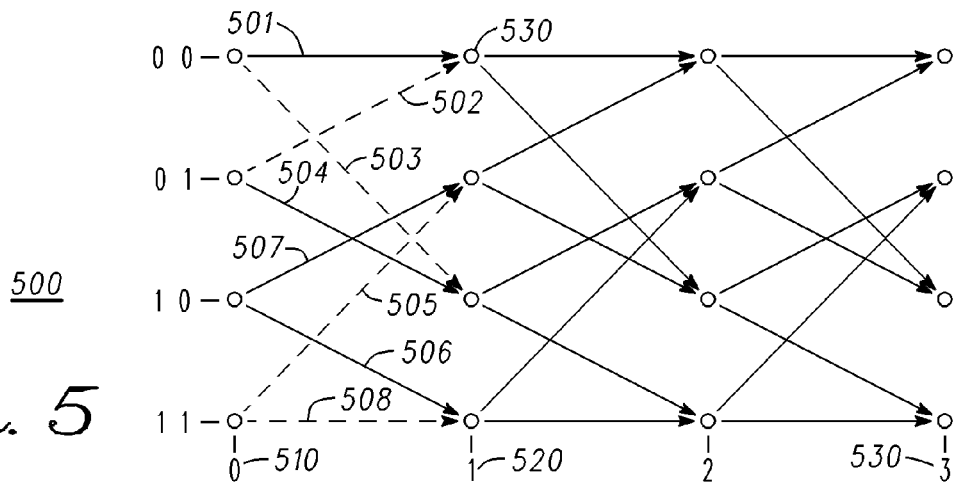
FIG. 5 is an example of the path metric comparisons.

FIG. 5 shows a simple example of the above for clarity. Here L=2 for 4 states at each of 4 trellis stages, N=3, and M=2 for two branches into and out of every node. Again, the path metrics for each of the four states at stage 0 510 are initialized to zero. Branch metrics for each of the 8 branches 501-508 are computed, and added to the path metrics resulting in a new path metric. At stage 1 520 of the trellis 500, at each node, the path metrics are compared, and the higher value metric, along with its survivor bit, is stored in memory. (Shown in dark line for clarity.) The lower value path metric is discarded. (Shown in dashed line.) For example, state 530 in stage 1 520 of trellis 500 may have been reached in one of two ways. A zero may have been shifted into 00, path 501. In this case, a 0 is shifted out, and is the survivor bit. Alternately, a 0 may have been shifted into 01, path 502. In this case a 1 is shifted out and is the survivor bit. Since in this example we chose the path metric for path 501 to be higher, that path metric, along with a survivor bit of 0, is stored. This process continues until stage 3 530 of trellis 500 is reached.

Figure 6:
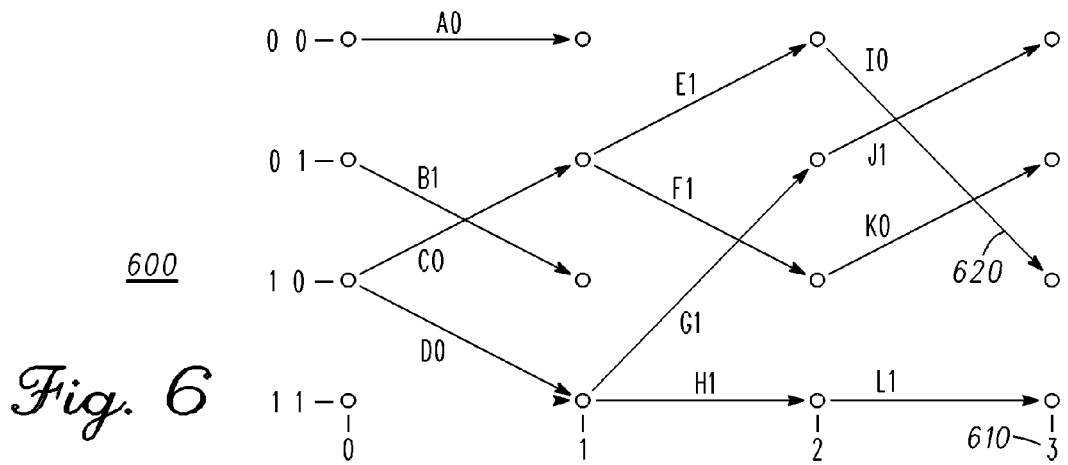
FIG. 6 is a further example of the path metric comparisons.

FIG. 6 shows the branch metrics, referred to here as A-L for simplicity, for each of the branches that had the highest path metric of the two branches going into each node. The survivor bit for each branch is also shown. When stage 3 610 of trellis 600 is reached the path metrics for each state are compared, and the highest identifies the final state. For example, at stage 3 610, the path metric for state 00 is J+G+D. For state 01, its K+F+C, and so on. Stated another way, the path metric at state 00 is J+the path metric up to state 01 at stage 2, which is G+D.

Assume for example, the highest path metric at the final stage is I+E+C. This would mean that 10 is the final state. The back trace is now begun. The survivor bit can be seen to be a 0 on branch 620. The zero is shifted into state 10 as an LSB, resulting in 00 at stage 2. From state 00 at stage 2, the survivor bit is observed to be a one, leading to state 01 at stage 1. The survivor bit here is seen to be a zero, leading us to the beginning at state 10 at stage 0. The actual transmitted data must therefore have been 010, the initial state was 10, and the final state was 10.

The above can be described by the following equations:

$J_n^0(q) = J_{n-1}(q\hat{}0) + dJ_n(q,0)$ partial path metric, predecessor bit 0

$J_n^1(q) = J_{n-1}(q\hat{}1) + dJ_n(q,1)$ partial path metric, predecessor bit 1

$dJ_n(q,0)$ is the branch metric for predecessor bit 0

$dJ_n(q,1)$ is the branch metric for predecessor bit 1

$J_n(q) = \max\{J_n^0(q), J_n^1(q)\}$ $a_n(q)$=survivor bit=predecessor bit for partial path with max metric [1]

This shows that path metrics are computed recursively, that is new branch metrics are added to path metrics, resulting in new values for the path metrics. These equations define the Viterbi Algorithm as used by one embodiment of the present invention.

Reference 2, as cited below, gives the following equations for the branch metrics [2]:

$$dJ_n^0(q) = 2\alpha_L z_n - s_0 + 2\alpha_L s_L - 2\alpha_L \sum_{k=1}^{L-1} s_k \alpha_{L-k} \quad [2]$$

$$dJ_n^1(q) = 2\alpha_L z_n - s_0 - 2\alpha_L s_L - 2\alpha_L \sum_{k=1}^{L-1} s_k \alpha_{L-k}$$

$q = [q_L, q_{L-1}, \ldots, q_1]$ trellis state $$\alpha_k = \begin{cases} 1 & \text{if } q_k = 1 \\ -1 & \text{if } q_k = 0 \end{cases} \quad k = 0, 1, 2, \ldots, L-1, L$$

where $z_n$ and $s_k$ are the MLSE data sources.

These equations may be simplified by dividing by 2, and adding $s_0$. The equations will then lose their accuracy as far as the absolute values of the branch matrices are concerned. This means they must be reviewed in the context of soft decision generation. However, the relative values will remain intact, leading to the correct selection of the maximum likelihood path through the trellis. The simplified equations are thus [3]:

$$dJ_n^0 = \alpha_L z_n + \alpha_L s_L - \alpha_L \sum_{k=1}^{L-1} s_k \alpha_{L-k} \quad [3]$$

$$dJ_n^1 = \alpha_L z_n - \alpha_L s_L - \alpha_L \sum_{k=1}^{L-1} s_k \alpha_{L-k}$$

These equations are then substituted into Equation [1], resulting in the following equations [4] which describe the method of the present invention of MLSE recursive computation of node metric Jn(q) and survivor bit an(q) for state q at stage n of the trellis:

$$J0 = J_{n-1}(q \wedge 0) - F([q, 0]) + \alpha_L z_n$$
$$J1 = J_{n-1}(q \wedge 1) - F([q, 1]) + +\alpha_L z_n$$
$$J_n(q) = \max\{J0, J1\}$$
$$a_n(q) = binarysign\{J0 - J1\}$$
$$F([q, 0]) = -\alpha_L s_L + \alpha_L \sum_{k=1}^{L-1} s_k \alpha_{L-k}$$
$$F([q, 1]) = F([q, 0]) - 2\alpha_L s_L$$
$$q = [q_L, q_{L-1}, \ldots, q_1] \text{ state vector}$$
$$\alpha_k = \begin{cases} -1 & \text{if } q_k = 0 \\ 1 & \text{if } q_k = 1 \end{cases}$$
[4]

In the above equations binarysign{argument} equals 0 if the argument is zero or positive, and 1 if the argument is negative. These equations are a variant of the Viterbi Algorithm that represents the method of the present invention for forward trace operation of the MLSE estimation of the transmitted sequence.

As stated above, the receiver uses the midamble bits 10 in FIG. 1 to create the coefficients $s_0, s_1, \ldots s_L$ which model the autocorrelation of the impulse response of the dispersive channel. Equation 4 defines the branch metrics to be functions of these coefficients. If the states of the trellis are sequenced in a Gray code fashion, the computation of the branch metrics becomes simplified enough to be performed in real time, as required by path metric decision making process.

FIG. 7 shows an example of this for the 32 states of a system with a channel memory length L=5. FIG. 7 illustrates by example the use of Gray coding of states to substantially simplify branch metric computations according to Equation [4]. The example is for the case of channel memory L=5. There are $2^L=32$ state values q so 32 pairs of values F(q, 0) and F(q,1) are computed. The Gray coded sequence of states q for the example are shown in column 720. Each row of the table shows the state q, F-Generator calculation of F(q,0) 700, and the computation of F(q,1) 710 For state zero, the 0 branch metric in column 700 is s, where $s=s_1+s_2+s_3+s_4+s_5$. This value may be precomputed. To find the 1 branch metric, we simply subtract $2s_5$ as indicated by the first entry in column 710. Next, the 0 branch metric for state 1 is computed by subtracting $2s_1$ from the previous entry in column 700, and so on. Similarly for the rest of the first half of the states, in the n-th row for the new n-th Gray coded state $q_{new}$, the Gray code bit change occurs in a bit index x. Then F(q,0) is equal to the value of the preceding value of F(q,0) in row n−1 for the preceding state $q_{old}$ in the preceding row for preceding state Gray coded state q plus or minus $2s_x$. The minus sign occurs if and only if the Gray code bit change is from a zero to a one. For each state value q, the value of F(q, 1) is equal to the value of F(q,0) minus $2s_5$.

For the second half of the states with most significant bit 1, the state 10000 is initialized with F(q,0)=−s. From then on, the value of F(q,1) is equal to F(q,0) plus $2s_5$. Also as before F(q,0) in row n is now equal to the value of the preceding value of F(q,0) in row n−1 for the preceding state $q_{old}$ in the preceding row for preceding state Gray coded state q plus or minus $2s_x$. But now the minus sign occurs if and only if the Gray code bit change is from a one to a zero.

FIG. 7 shows that by using equation 4, and Gray coding, the branch metrics may be calculated by simple steps in taken in sequential order. Therefore, the branch metrics may be calculated in real time, as they are required. This eliminates the need to store the branch matrices in memory, as is done in Reference 3, as cited below. This means less memory required on the integrated circuit on which the MLSE is placed.

In order to simplify the branch metric calculations as much as possible, the states are not progressed through in pure Gray code. Rather, the first half of the states are stepped in Gray code, the MSB is set to one, and the LSBs are stepped in Gray code again. As an example, in FIG. 7, states 0 to 15 are in Gray code order in the second column 720 from 00000 to 01000. At that point, instead of going to 11000 for state 16, the MSB is set to one, the 4 LSBs are set to zero, and the Gray counting begins again for the 4 LSBs from state 10000 to 11000. In this way, symmetry between the first and last 16 states is preserved, and the branch metric calculations simplified. Further, methods such as taking the complements of previously found values may be used to further simplify calculations. In other embodiments of the present invention, the states may be arranged in a pure Gray code fashion. Alternately, the state transitions may be limited to one bit changing between consecutive states. Alternately, the state transitions may be limited to two bits changing between consecutive states. Alternately, the state transitions may be limited to some other number of bits changing between consecutive states, such as 3, or 4.

In summary, the following may be used to calculate the branch matrices so long as the states are Gray coded [5]:

$$F(q_{new}, 0) = F(q_{old}, 0) \pm 2s_x$$

x=bit index of the state q where bit change occurred in transition $q_{old} \rightarrow q_{new}$ ±takes negative value when Gray code bit change is from 0 to 1 for msb of q is 0

±takes negative value when Gray code bit change is from 1 to 0 for msb of q is 1

$$F(q_{new}, 1) = F(q_{new}, 0) \pm 2s_L$$

±takes negative value if msb of q is 0, positive value otherwise [5]

The recursive method of branch metric parameter calculation in Equation [5] according to the present invention requires only one addition per parameter F(q,0) or F(q,1).

In the above described embodiments of the present invention, all the trellis initial states were assigned equal likelihood values of zero. This makes sense if no information is known about the initial state. However, as an example, in FIG. 1 in a GSM data burst, the LHS data 20 is preceded by tail bits 25 and dummy bits 22. For L=5, a possible known initial state could be 11000. By using this initial state, the accuracy of the MLSE may be improved. However, as can be seen in FIG. 1, the power is ramping up during the transmission of the dummy bits 22. The received bits are corrected based on how the channel disperses the midamble, which is sent at the peak power level. Data sent at different power levels will be affected by the channel differently. Therefore, the first 110 of the initial state may be inaccurate.

One embodiment of the present invention makes use of an initial state register, and an initial state mask. The initial state register holds the known initial state of length L bits. The initial state mask contains a bit sequence of L bits wherein bit value of 0 in the i-th position indicates that the bit in the i-th position of the initial state register is valid. A bit value of 1 in the i-th position indicates a don't care for the i-th position of the initial state register.

As an example, if the initial state register contains 10010, and the initial state mask register contains 00000, then the only valid initial state is 10010, since the mask indicates all the bits in the initial state register are valid. As a further example, if the initial state register contains 00000, and the initial state mask contains 00011, then 00000, 00001, 00010, and 00011 are all valid initial states.

The invalid states likelihood may then be initialized with a very large negative value, while valid state are initialized to zero. In this way, the invalid states start at such a large deficit, that path matrices which take their origin from an invalid state could never have a higher value than the path matrices which originate from a valid state.

A further refinement may be made at the end of the trellis. The above described embodiments of the present invention selected the highest path matrices at stage N of the trellis. By adding a final state register, and a final state mask, the selection process may be changed to picking the highest path matrices corresponding to a valid final state. In this way, the trace back must start and end on valid final and initial states, thereby improving the bit error rate performance of the MLSE.

Figure 8:
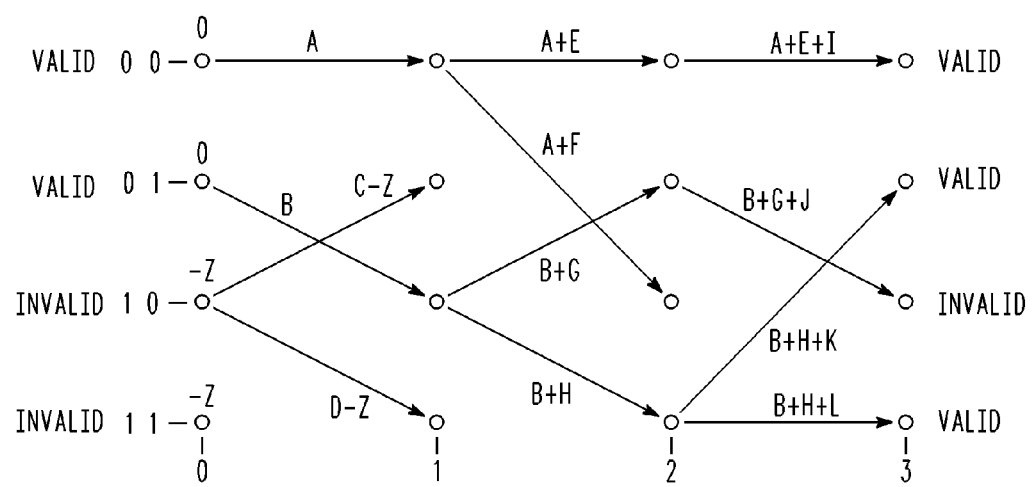
FIG. 8 is an example of a trellis having known valid initial and final states.

As an example, in FIG. 8, the initial states 10, and 11 are invalid. These states are assigned large negative values −z. The surviving branches are shown, the others are deleted. While branches from state 10, and 11 may have higher metrics than each other, they can't have a higher metric then paths originating at states 00, and 01. Paths starting from invalid states quickly terminate, and if one did make it to the end, it would be eliminated by the comparison circuits at that time. In this example, the three valid final states 00, 01, and 11 are compared, and the traceback begins.

FIG. 9 shows a block diagram of a general linear carrier-modulated digital data transmission system 901 that utilizes a MLSE receiver. The major parts of the system are the transmitter 905, dispersive channel 915, and receiver 925. The transmitter has a coder 900, a modulator 920, and frequency upconverter 940. The coder provides error correction coding and interleaving of user data to generate a sequence of coded data symbols 910. The coded data symbols are digitally modulated onto a carrier by linear data modulator 920, and frequency upconverter 940. The resultant signal propagates through the dispersive channel 915, which induces intersymbol interference. The signal is received by receiver 925, which is optimum in the sense that the receiver determines a maximum likelihood sequence estimate 955 of the transmitted coded data sequence 910. The receiver 925 has a downconverter 970, a low pass filter 990, a ML receiver 945, and decoder 965. The received signal is converted in frequency to a complex baseband signal 980 by the downconverter 970. The baseband signal 980 is filtered by the lowpass filter 990. The filtered baseband signal 935 is processed by the ML receiver 945 which generates the MLSE 955 for the transmitter coded data sequence 910. The MLSE 955 is then decoded and deinterleaved by the decoder 965. There are many other possible embodiments of this system known to persons skilled in the art.

FIG. 10 shows a more detailed view of the ML receiver subsystem 945 which is configured in accordance of the description by Ungerboeck in Reference 2. ML receiver 945 has a channel estimator 1020, correlator (not shown), matched filter 1030, and MLSE 1080. The received filtered baseband signal 1010 is processed by the channel estimator which generates an estimate of the complex channel impulse response h(t) 1040. The impulse response is time reversed and conjugated to form the matched filter 1030. The filtered baseband signal 1010 is passed through the matched filter 1030 to obtain a matched filter output sample sequence $z_0$, $z_1$, ... 1070 which represent observations for the MLSE. The sample period of the matched filter output sequence 1070 is equal to the coded symbol period of the transmitted digital data 910 in FIG. 9. The correlator computes a discrete time autocorrelation sequence of the channel impulse response $s_0$, $s_1$, $s_2$, ..., $s_L$, where the autocorrelation sample sequences are spaced in time at the modulation symbol rate. The parameter L is the length of the channel impulse response representing the channel memory. The MLSE 1080 computes the maximum likelihood sequence estimate $\hat{a}(0)$, $\hat{a}(1)$, ... 1090 of the transmitted data sequence based on processing of observations $z_0$, $z_1$, ... 1070 and channel autocorrelation parameters $s_0$, $s_1$, $s_2$, ..., $s_L$ 1050. In summary, the MLSE outputs maximum likelihood estimate $\hat{a}(0)$, $\hat{a}(1)$, ... 1090 based on input data sources $z_0$, $z_1$, ... 35 1070 and $s_0$, $s_1$, $s_2$, ..., $s_L$ 1050. It is understood by persons skilled in the art that although the original theory of maximum likelihood receivers as described for example in References 1 and 2, cited below, apply to linear modulations, the theory can be usefully extended to certain nonlinear modulations as well such as GMSK by means of suitable linear approximations.

The computed maximum likelihood sequence estimates 1090 that are output by the MLSE are inherently hard decisions; that is, the decision $a_n\hat{}$ for the n-th symbol has a value from the discrete symbol alphabet of the modulation data 910. It is well known that soft decision decoders that utilize available soft decision metrics generally have superior error rate performance relative to decoders that utilize only hard decision information. The MLSE can be optionally augmented with a soft decision generator 1055 which provides a soft decision metric $b_n$ 1060 for each symbol hard decision $a_n\hat{}$ output by the MLSE. The soft metric is a measure of the certainty of the hard decision. The MLSE hard decisions 1090, and optionally the corresponding soft metrics 1060, are output to the decoder 965.

A computational method typically used for the MLSE 1080 is known in the art as the Viterbi algorithm and one embodiment of the present invention uses a variant of the Viterbi algorithm which can he summarized as follows. The MLSE operates on the observation sequence $z_0$, $z_1$ ... 1070 which are sufficient statistics, that is, contains all relevant information for maximum likelihood estimation of the transmitted sequence 910. For any hypothesized transmitted sequence $a_0$, $a_1$, ... there is an associated state sequence representation ... $\sigma_0$, $\sigma_1$, ... where $\sigma_n = [a_n, a_{n-1}, a_{n-L}]$, and L is the channel memory. Determination of the maximum likelihood symbol sequence is equivalent to determination of the corresponding maximum likelihood state sequence so that the two are mentioned interchangeably.

FIG. 11 shows the preferred embodiment of the MLSE 1080 according to an embodiment of the present invention. The MLSE comprises an Arithmetic Logic Unit (ALU) 1130, F-Generator 1120, FSM 1125, and Memory 1105. The ALU 1130 provides computational means for both forward trace of the Viterbi Algorithm computation in accordance with Equations [4] and backward trace computation. The Memory 1105 provides data storage means in support of the ALU computations. The Memory 1105 provides means for storage of four types of data which are stored in respective memory modules 1135, 1136, 1137, and 1138. The memory module 1137 labeled State Memory Mem_j has address variable addr_j (not shown) which provides means for reading and writing path metric values $J_n(q)$ by the ALU 1130 for all $2^L$ states q and for trellis stages n from 1 to N. Mem_j need only hold two stages of metric values at any time, current stage n and past stage n−1, since the data storage locations for the two stages are alternated in Ping-Pong fashion. That is, the ALU 1130 overwrites data storage locations of Mem_j holding stage n−2 node metrics with node metrics of current stage n because the stage n−2 node metrics are no longer needed in the recursive computations of Equations [4] for $J_n(q)$. The ALU 1130 reads data from the specific address of Mem_j holding predecessor state metrics (n−1) when needed in the ALU 1130 computations. During forward trace, the memory module 1138 labeled Trace Memory Mem_a having address variable addr_a (not shown) provides means for writing and reading of survivor bits $a_n(q)$ for stage n and state q by the ALU for each of the $N \times 2^L$ nodes q of the trellis. The data $a_n(q)$ 1165 is written into Mem_a 1138 by the ALU 1130 during the forward trace operation of the MLSE 1080. During backward trace the ALU reads the sequence of survivor bits $a_n(q_n\hat{\,})$ 1160 for n=N, N−1 . . . from Mem_a 1138 to determine the corresponding maximum likelihood symbol $a_n\hat{\,}$ which is rewritten back into Mem_a 1138. The memory module 1136 labeled Observation Memory Mem_obs with address variable addr_obs (not shown) provides means for writing and reading of the message output sequence $z_n$, n=1, 2, . . . , N 1140 of the matched filter 1030 which serves as a data source for the MLSE 1080. The ALU reads the data from Mem_obs 1136 as needed to compute the path metrics accordance with Equations [4]. The memory module 1135 labeled Correlation Memory Mem_cor provides means for reading and writing of the L+1 data elements corresponding to twice autocorellation values $2s_1, 2s_2, \ldots, 2s_L$, 1110 of the channel impulse response and the sum of autocorrelation values $s = s_0 + s_1 + \ldots + s_L$. The data elements stored in Mem_cor 1135 are computed and written to Mem_cor 1135 by the correlator, and made available to the F-Generator 1120 as needed to compute branch metric parameters $F(q,0)$ and $F(q,1)$ in accordance with Equations [4].

For the optional Soft Decision Generator 1055 of FIG. 10, the ALU 1030 outputs partial path metrics J0 and J1 for each node to support the soft decision computations.

The Finite State Machine (FSM) 1125 provides means for control and sequencing of the MLSE operation via control signals 1135. Thus, the FSM control signals include designation of the addresses addr_j, addr_a, and addr_obs for reading and writing of specific data by the ALU from respective memory modules 1137, 1138, and 1136. The controls also include sequencing of the current state q, and the current stage n, where the pair (n,q) designate a specific node in the trellis during forward trace operation through the trellis. The trellis stage sequencing is n=1, 2, . . . N, and for value of n, the state values q sequence through a Gray code sequence as described above, and again here. The ALU 1130 computes and F-Generator 1120 jointly compute the state metric $J_n(q)$ and survivor bit $a_n(q)$ for each node (n,q) in accordance Equations [4]. The FSM provides means for control of the operation of signal processing elements such as latches, multiplexers, adders, and registers comprising the ALU and F-Generator. The MLSE operation under FSM control operates in four phases: (1) forward trace initialization, (2) forward trace, (3) backward trace initialization, and (4) backward trace. The phases are sequential except that backward trace initialization phase overlaps with the final stage N of the forward trace phase.

The F-generator 1120 provides means for computation of branch metric parameters $F(q,0)$ and $F(q,1)$ for the current state q in accordance with Equations [4], where the computations are in real time, that is, computed when needed by the ALU 1130. For each stage of the trellis, the sequencing of the $2^L$ states q by the FSM 1125 is according to a Gray code. In FIG. 7, an example of a Gray coded state sequence was shown for the 32 states for the case of channel memory length L=5. The Gray coding of the state sequence substantially simplifies the computation of the branch metric parameters $F(q,0)$ and $F(q,1)$ in the F-Generator. The method initializes and performs the calculation for the first half of the states with the most significant bit 0, and then performs the calculation for the second half of the states with most significant bit 1.

Figure 12:
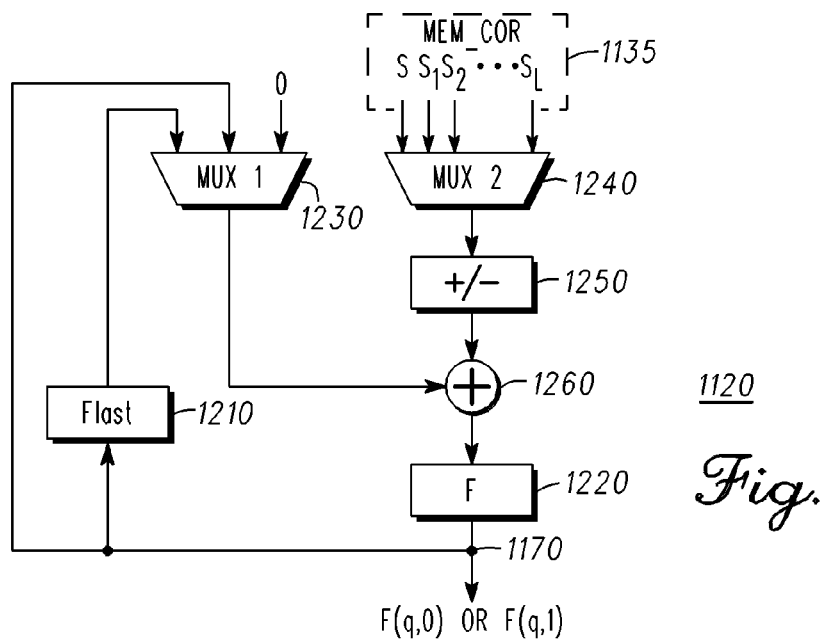
FIG. 12 is an illustration of the preferred embodiment for the F-Generator method of computation of branch metric parameters $F(q,0)$ and $F(q,1)$.

FIG. 12 shows the an embodiment for the F-generator 1120 consistent with the present invention and suited for VLSI implementation. The F-Generator 1120 provides means for executing the novel recursive method of computation of Equations [5]. The F-Generator comprises signal processing components including latches 1220 and 1210 labeled F and Flast respectively, adder 1260, multiplexers 1230 and 1240 labeled Mux 1 and Mux 2 respectively, and sign inverter 1250. Multiplexer 1240 has L+1 selectable input sources, where the input sources are respectively the L+1 channel autocorrelation data words stored in memory Mem_cor 1135 of FIG. 11. The sign inverter 1250 is a single-input single output device which provides means for passing data from input to output either with or without data inversion. The operation of the signal processing components are controlled by the FSM control signal with supporting signal processing clock (not shown). Latch F 1220 alternately presents the values of the branch metrics $F(q,0)$ and $F(q,1)$ to the ALU 1130 of FIG. 11 for the Gray coded sequence of state values q according to Equations [5] by means of the following signal processing steps at each stage n of the trellis.

Step 1. The initial state q is set to the initial all-zeros state.

Step 2. Multiplexer 1230 selects as input the register (not shown) holding value zero and the multiplexer Mux 2 1240 selects as input the Memcor memory 1135 location for parameter s. The inverter 1250 is set for no inversion. The latch F 1220 receives value s which is the value $F(q,0)$ for the initial all-zeros state. The F latch content $F(q,0)$ is an output 1170 available to the ALU 1130 to support computation of Equation [4] for initial state q.

Step 3. Latch Flast 1210 receives the value in latch F 1220 so that Flast=$F(q,0)$.

Step 4. Multiplexer Mux 1 1230 selects latch Flast 1210 as input. Multiplexer Mux 2 1240 selects as input the Memcor memory 1135 location storing parameter $2s_L$ (alternately, the parameter SL may be stored, and left shifted one bit to multiply it by 2). The inverter 1250 is set so that its output value is the negative of its input value. The input to adder 1260 is then the output of latch Flast 1210, and negative $2s_L$. The input to latch F 1220 is then equal to Flast−$2s_L$=$F(q,0)$−$2s_L$=$F(q,1)$. The latch F value $F(q,1)$ for state q is then presented as an output 1220 to the ALU 1130.

Step 5. The FSM increments the Gray coded state q, that is, the next Gray coded state $q_{new}$ is set by the FSM resulting in a bit change relative to the preceding old state vector $q_{old}$ at bit index x of the state. That is $q_x$ is incremented in a Gray code fashion to the next state in the second column 720 in FIG. 7.

Step 6. Multiplexer Mux 2 1240 selects as input the Mem_cor memory 1135 location for parameter $2s_x$. The inverter 1250 is set for sign inversion if and only if the Gray code state change in Step 5 is a bit change from a 0 to a 1. Then latch F=Flast +/−$2s_x$ where the negative sign applies if the Gray code bit change is from a 0 to a 1. Since Flast is the value $F(q_{old},0)$ for preceding state $q_{old}$, then $F=F(q_{old},0)+/-2s_x=F(q_{new},0)$. The value of F(qnew,0) held in latch F 1220 is presented as an output 1170 to the ALU 1130.

Step sequence 5,6,3,4 are repeatedly executed by the F-Generator for each state value through the final Gray coded state value.

There are obvious variations on the preferred embodiment for computing the pair of branch metric parameters F(q,0) and F(q,1) according to Equations [5]. The value of F(q,0) for state q is inverted if the state q is complemented. That is, F(q,0)=F(q*,0) where q* is the complement of q. Therefore, in one variation, only half the parameter values are computed as in the preferred embodiment, and the other half are obtained by inversion. For example in FIG. 5, the Gray coded states with MSB=0 can be calculated as in the preferred embodiment, and for each state q thus calculated, F(q*,0) and F(q*,1) for the complemented state can be obtained simply by inverting the values of F(q,0) and F(q,1) respectively. The set of all complemented states correspond the remaining half of the states with MSB=1.

Figure 13:
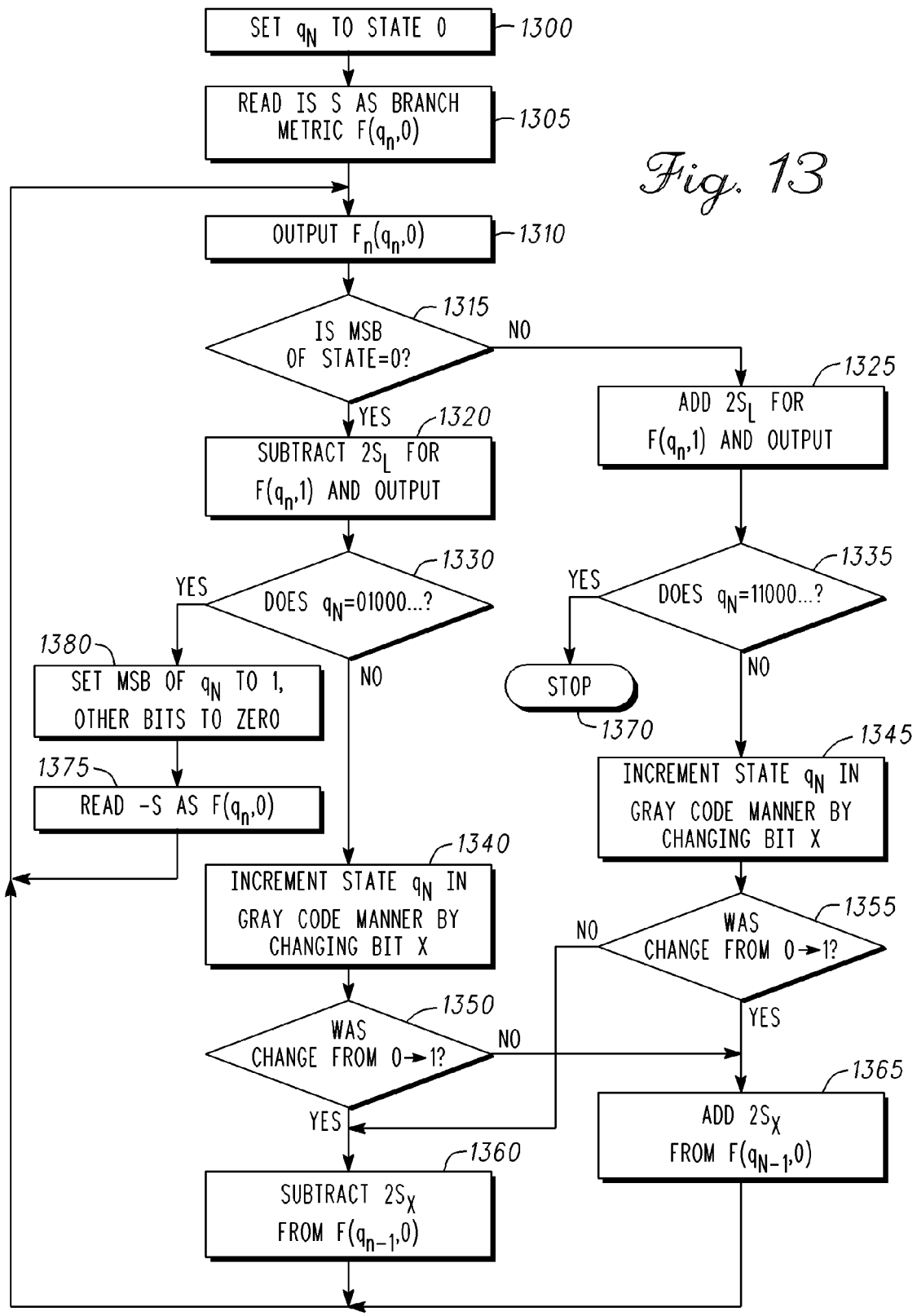
FIG. 13 is a flow chart of a method of computation of branch metric parameters in accordance with the present invention.

FIG. 13 shows a flow chart for the branch metric calculations consistent with one embodiment of the present invention. At act 1300 the state is initialized to zero. Parameter s is read from memory as F(q,0) in act 1305, and output in act 1310. Branch metric F(q,1) is then computed from F(q,0). If the MSB of the present state is zero, then $2s_L$, where L is the channel memory, is subtracted from F(q,0) resulting in F(q,1) in act 1320. If the MSB of the present state is one, then $2s_L$, where L is the channel memory, is added to F(q,0) resulting in F(q,1) in act 1325.

As discussed above, in order to simplify the branch metric calculations as much as possible, the states are not progressed through in pure Gray code. Rather, the first half of the state are stepped in Gray code, the MSB is set to one, and the LSBs are stepped in Gray code again. As an example, in FIG. 7, states 0 to 15 are in Gray code order in the second column 720 from 00000 to 01000. At that point, instead of going to 11000 for state 16, the MSB is set to one, the 4 LSBs are set to zero, and the Gray counting begins again for the 4 LSBs from state 10000 to 11000. The net result of this is that codes 16 to 31 are stepped through in reverse order. In this way, symmetry between the first and last 16 states is preserved, and the branch metric calculations simplified. Further, methods such as taking the complements of previously found values may be used to further simplify calculations. Another embodiment of the present invention uses Gray coding in a pure Gray code sequence for all states. What is preferred is that only bit change between consecutive states. Other embodiments are possible. For example, a sequence of arranging the states where either one or two bits are changed between consecutive states could be used. In that case two computations per state change may be required. Alternately, a sequence of states where three or less, or some number greater than three, such as four, or less, bits are changed between consecutive states could be used. Accordingly, a greater number of computations may be required for each state change.

As described above, for one embodiment of the present invention, the counter counts Gray code from 0 to 15 with the MSB=0. Then the MSB is set to 1, and the four LSBs repeat counting from 0 to 15 again. Therefore, acts 1330 and 1335 check to see if 01000 or 11000 have been reached. If 01000 has been reached 1330, the state is set to 10000 act 1380, -s is read in as F(q,0) act 1375, and output in act 1310. If 11000 has been reached, the branch metrics for the last state have been computed, and the process comes to a stop in act 1370. If 01000 or 11000 have not been reached, the state is incremented in Gray code fashion acts 1340, or 1345 as appropriate. Next the bit that was changed is observed as to whether it was a 0 to 1 transition. If the answer is yes and the MSB is zero, or the answer is no and the MSB is one, then $2s_x$ is subtracted from the F(q,0) of the previous state to generate the F(q,0) for the present state in act 1360. X is the bit position that was changed between the previous state and the present state. If the answer is no and the MSB is zero, or the answer is yes and the MSB is one, then $2s_x$ is added to the F(q,0) of the previous state to generate the F(q,0) for the present state in act 1365. F(q,0) is then output in act 1310, and the process repeats. In this example, L was chosen to be 5, but the example is applicable for L of any value with simple changes such as counting to 0100 and 1100, or 010000 and 110000 if L=4 and 6 respectively.

Figure 14:
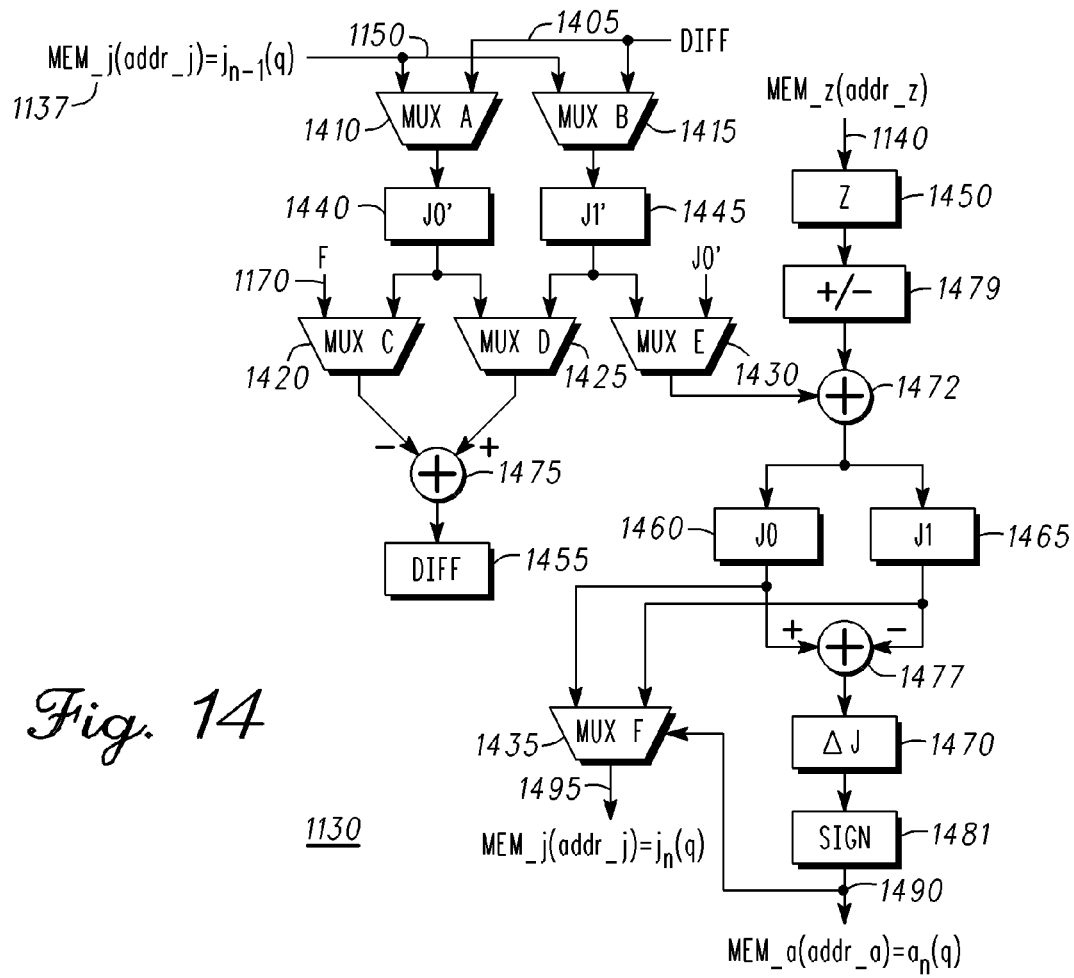
FIG. 14 describes an embodiment for the ALU method of Viterbi Algorithm calculation for the forward trace phase.

FIG. 14 illustrates the preferred embodiment for the forward trace computation of the state metrics $J_n(q)$ and survivor bits $a_n(q)$ by the ALU 1130 in accordance with Equations [4] as used by one embodiment of the present invention. The ALU signal processing for forward trace operation comprises six multiplexers 1410, 1415, 1420, 1425, 1430, and 1435 labeled Mux A, Mux B, Mux C, Mux D, Mux E, and Mux F respectively, five latches 1440, 1445, 1450, 1455, 1460, 1465, and 1470, labeled J0', J1', z, Diff, J0, J1, and ΔJ respectively, one adder 1472, two subtractors 1475 and 1477, a sign inverter 1479, and a sign operator 1481. The subtractor 1475 computes as output the Mux D 1425 latched value minus the Mux C 1420 latched value. The subtractor means 1477 computes as output the J0 latch value minus the J1 latch value. The output of sign inverter means 1479 is equal to its input if the MSB of state q is 1, and otherwise the output is the negative of the input. The sign operator means 1481 outputs the sign bit of the latch ΔJ 1470 value expressed as a twos complement number; that is, the output is 1 if the latched value in ΔJ 1470 is negative and the output is 0 if the latched value in ΔJ 1470 is zero or positive.

The ALU described in FIG. 14 provides for the following sequence of signal processing steps under control of the FSM. In the first phase, the FSM resets State Metric Memory Mem_j so that all addresses corresponding to the initial stage metrics $J_0(q)$ for all $2^L$ states q contain zero value. In the second phase, the FSM sequences the state or node designations of the trellis (n,q), from stage to stage n=1, 2, . . . , N, and for each stage sequences the states q through all $2^L$ Gray coded states, or modified Gray code states as described above. For each node or state (n,q) of the trellis, the ALU computes the survivor bit $a_n(q)$ and state metric $J_n(q)$ in accordance with Equations [4] in the following way.

Step A. Address addr_j is set for reading of memory Mem_j 1137 the storage location for the state metric $J_{n-1}(q\hat{\,}0)$ 1150 for predecessor state $q\hat{\,}0$ corresponding to predecessor bit 0.

Step B. Mux A 1410 selects input from memory Mem_j 1137. Latch J0' 1440 receives stored value in Mem_j(addr_j). That is $J0'=J_{n-1}(q\hat{\,}0)$.

Step C. Address addr_j is set for reading of memory Mem_j 1137 the storage location for the state metric $J_{n-1}(q\hat{\,}1)$ for predecessor state $q\hat{\,}2$ corresponding to predecessor bit 1.

Step D. Mux C 1420 selects as input the F-Generator output 1170, Mux D 1425 selects J0'1440 as an input, and Mux A 1410 selects Diff as an input. Then, J0'=Diff=J0'-F=$J_{n-1}(q\hat{\,}0)$-F. As presently described the F-Generator control will be phased such that the F-Generator output F=F(q,0) at this step so that J0'=$J_{n-1}(q\hat{\,}0)$-F(q,0).

Mux E 1430 selects input from memory Mem_j 1137. Latch J1' 1445 receives stored value in Mem_j(addr_j). That is $J1'=J_{n-1}(q\hat{\,}1)$.

Step E. Mux C 1420 selects as input the F-Generator output 1170, Mux D 1425 selects the output of J1'1445 as an input, and Mux B 1415 selects Diff 1405 as an input. Then, $J1'=Diff=J1'-F=J_{n-1}(q\hat{\,}1)-F$. As presently described the F-Generator control will be phased such that the F-Generator output $F=F(q,1)$ at this step so that $J1'=J_{n-1}(q\hat{\,}1)-F(q,1)$.

Step F. Mux E 1430 selects the output of J0' 1440. The execution of this step under FSM control coincides with Step D so that $J0'=J_{n-1}(q\hat{\,}0)-F(q,0)$. The address addr_z of memory Mem_z 1140 is set to the location of observation variable $z_n$ for reading by the ALU 1130. Latch J0 1440 is enabled so that it receives partial path metric $J0=J0'+/-z_n.=J_{n-1}(q\hat{\,}0)-F(q,0)+/-z_n$.

Step G. Mux E 1430 selects the output of J1' 1445. The execution of this step under FSM control coincides with Step E so that $J1'=J_{n-1}(q\hat{\,}1)-F(q,1)$. The address addr_z of memory Mem_z is set to the location of observation variable $z_n$ for reading by the ALU. Latch J1 1465 is enabled so that it receives partial path metric $J1=J1'+/-z_n.=J_{n-1}(q\hat{\,}1)-F(q,1)+/-z_n$.

Step H. The address addr_a 1160 of Trace Memory Mem_a 1138 is set for writing to the storage location for survivor bit $a_n(q)$. The address addr_j 1145 of State Metric Memory Mem_j 1137 is set for writing to the storage location for state metric $J_n(q)$, Step I. Latch ΔJ 1470 is enabled so that $\Delta J=J1-J0$ gets the differential of the path metrics. The output 1490 of the sign operator 1481 is the survivor bit $a_n(q)$, i.e., binarysign {J0−J1} which has binary value 0 if J0 is greater than or equal to J1 and binary value 1 if J1 is greater than J0. The output $a_n(q)$ 1481 is written to Mem_a 1138.

Step J. Mux F 1435 selects the output of J0 1460 if $a_n(q)$ is 0 or the output of J1 1465 if $a_n(q)$ is 1. The Mux F 1435 output 1495 $J_n(q)=\max\{J0,J1\}$ is written to memory Mem_j 1138.

The preceding signal processing steps describe the method of the preferred embodiment of the MLSE Viterbi Algorithm for forward trace operation according to Equation [4]. The processing can be implemented in VLSI hardware wherein multiple steps are performed in parallel under FSM control and data processing clock. Table 1 summarizes the parallel processing steps and phasing of the processing clock for the ALU and F-Generator. Each state q at each trellis stage n requires computation of survivor bit $a_n(q)$, state metric $J_n(q)$, and supporting branch metric parameters $F(q,0)$ and $F(q,1)$. After initialization, the signal processing steps of the ALU and F-Generator are both performed in parallel in two clock cycles per state. The first row of Table 1 indicates the processing clock phasing or modulus value 0 or 1. The second row indicates at which clock phase each ALU processing step is performed. The third row indicates at which clock phase each F-Generator processing step is performed. In Table 1, the relative timing of the processing provides at F-Generator output 1170 the values of computed branch metric parameter values $F(q,0)$ and $F(q,1)$ precisely when needed by the ALU processing. In this way, the branch metrics are computed in real time, and are available to the ALU 1130 when required to compute the path metrics. The ability to compute the branch metrics in real time eliminates the need to precompute them and store them in memory, thus reducing the die size of an integrated circuit implementing a MLSE in accordance with the present invention.

Steps 1 through 7 for the F-Generator 1120 and Steps A through G for the ALU 1130 describe the signal processing steps associated with forward trace operation of the MLSE Viterbi Algorithm for the preferred embodiment in accordance with Equation [4]. The processing can be implemented in VLSI hardware and multiple steps are performed in parallel under FSM control and associated data processing clock. The signal processing steps of the state metrics and survivor bits for each node of the trellis are computed in parallel with two clock cycles per state metric calculation under FSM control. The parallel operations are Steps 3, 4, A, D, and F executed on odd clock cycles and Steps 1, 2, 5, 6, B, C, and E executed on even clock cycles. Since the F-Generator and ALU 1130 perform in parallel, the branch metrics may be computed "on the fly" in real time as needed, thus eliminating the requirements of precomputing and storing the branch metrics ahead of time. This means not only as discussed above, that the integrated circuit memory may be reduced, but that such reduction does not occur at the cost of extra clock cycles.

Figure 15:
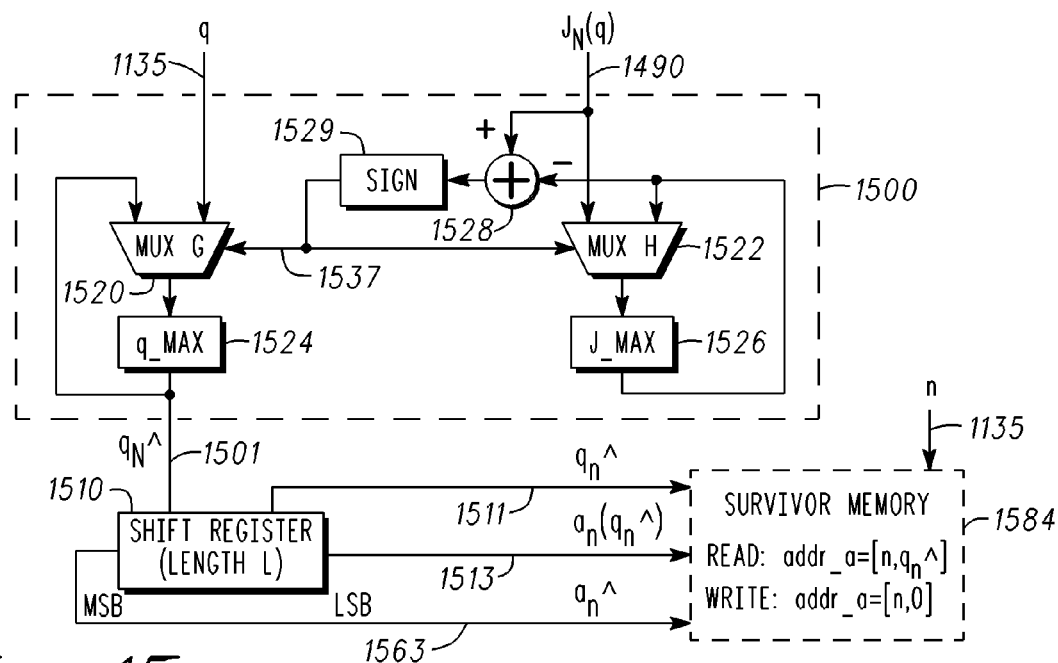
FIG. 15 describes an embodiment for the ALU method of Viterbi Algorithm calculation for backward trace phase of operation.

Following forward trace operation, the third FSM phase is backward trace initialization, followed by the fourth FSM phase of backward trace operation. FIG. 15 shows the preferred embodiment of the ALU 1130 signal processing that supports backward trace phase and the preceding initialization phase. The ALU 1130 for the backward trace operation comprises a metric comparator 1500, and a shift register 1510. The Metric Comparator 1500 provides means for calculation of the final trellis state $q_N\hat{\,}$ on the maximum likelihood path through the trellis. The final trellis state $q_N\hat{\,}$ has maximum metric among all states q in the final trellis stage N, and serves as the initial state in the backward trace phase of operation. The Metric comparator is enabled by the FSM only during the Viterbi Algorithm calculations for the final stage N of the trellis. The inputs to the Metric Comparator are the sequence of states q 1135 and the corresponding calculated state metrics $J_N(q)$ 1490 for trellis stage N, and at the end of stage N, the output 1501 from the Metric Comparator is the final state $q_N\hat{\,}$ of the maximum likelihood path.

The backward trace initialization phase is provided by the following ALU apparatus. The Metric Comparator 1500 comprises two multiplexers 1520 and 1522 respectively labeled Mux G and Mux H, two latches 1524 and 1526 respectively labeled q-max and J_max, a subtractor 1528, and a sign operator 1529. The subtractor 1528 computes the value of the new state metric $J_N(q)$ minus the value of the state metric in latch J_max in two's complement arithmetic and the 2-s complement sign of the remainder is output by the sign operator 1529 as the control signal 1537 for the two multiplexers. When the control signal has value 0, the new state metric is larger than the contents of latch J_max, Mux H 1522 selects the input as the new state metric value $J_N(q)$, and Mux G 1520 selects the new state value q on line 1135. The signal on control line 1537 thereby causes the latches J_max 1526 and q_max 1534 to hold the largest state metric and associated state as the ALU sequentially computes the state metrics $J_n(q)$ for final stage N of the trellis. At the end of forward trace computation at stage N, the contents $q_N\hat{\,}$ in latch q_max 1524 is the state having the largest final state metric. The ALU 1130 provides means for shifting the $q_N\hat{\,}$ into the shift register 1510 which completes initialization of the backward trace operation.

In FIG. 15 the shift register 1510 is the realization of the conceptual shift register of FIG. 2. Thus, the shift register 1510 provides for storing a state vector of L bits, where L is the dispersive channel memory length in symbol lengths. The shift register means provides for shifting of the state vector one symbol toward the MSB direction (left), with shift register input 1513 of one bit into the vacated LSB bit position, and shift register output 1563 of one bit corresponding to the bit that vacated the MSB bit position of the shift register. The FSM now controls the trace back operation by sequentially down counting the trellis stage index n so that n=N, N–1, . . . 1. For the traceback routine at trellis stage N, the initial shift register state $q_N\hat{}$ loaded during backward trace initialization phase is sent to the Trace Memory Mem_a 1138 and the survivor bit $a_N(q_N\hat{})$ is read out of Mem_a 1138 from readout address addr_a =[N, $q_N\hat{}$]. The shift register shifts one bit left and the survivor bit $a_N(q_N\hat{})$ is input to the shift register at the LSB position and the MLSE estimate $a_N\hat{}$ for the final symbol is output from the MSB position of the shift register. The ALU 1130 provides means to write shift register MSB output $a_N\hat{}$ 63 into Mem_a 1138 at address addr_a =[N, 0]. The shift register now contains the state $q_{N-1}\hat{}$ on the maximum likelihood path at stage N–1. The traceback routine for stage N is repeated for stage N–1. That is, shift register state $q_{N-1}\hat{}$ is used to read the survivor bit $a_{N-1}(q_{N-1}\hat{})$ from memory Mem_a 1138 and the survivor bit is then input to the vacated shift register LSB position when the shift register state vector is shifted one bit left. The output of the shift register from the MSB position $a_{N-1}\hat{}$ corresponds to the MLSE estimate for symbol index N–1 and is stored in memory Mem_a at address addr_a=[N–1, 0]. The traceback routine is thus repeated sequentially for stages n=N–2, N–3, . . . , 1. Then at termination of the traceback routine for stage n=1, the MLSE estimate $a_1\hat{}, a_2\hat{}, \ldots, a_N\hat{}$ of the transmitted data sequence 910 is contained in memory Mem_a 1138. If the address addr_a =[n,q] is interpreted as the n-th row and q-th column of an N×$2^L$ memory array for Mem_a, then the MLSE estimate is stored in the first column of Mem_a ready for usage by the decoder 965.

Table 2 summarizes the number of processing clock cycles required for the preferred embodiment of the present invention to generate a maximum likelihood sequence estimate of a block of N transmitted data symbols 910. The required processing clock cycles is shown for each of the four phases of MLSE operation under FSM control: (1) initialization of the state metric memory for forward trace, (2) forward trace calculations for state metrics $J_n(q)$ and survivor bits $a_n(q)$, (3) backward trace initialization, and (4) backward trace to obtain for maximum likelihood sequence estimate $a_n\hat{}$ from Trace Memory. Table 2 shows that the total number of clock cycles required to process a block of N symbols is ($2^L$×2×N)+N cycles.

As a numerical example, the GSM standard for cellular telecommunications [Ref. 4] is considered. For the GSM standard, data is transmitted in bursts within time-division slots, and FIG. 1 illustrated the burst data format for a slot. A natural processing block for the MLSE is the block of N=58 data bits wherein the Viterbi Algorithm is computed first for the LHS data block, and then independently for the RHS data block. For GSM the maximum channel memory is L=5 symbol lengths. Then evaluating Table 2 for the case L=5 and N=58, the preferred embodiment of the MLSE of the present invention requires 3778 cycles per block and 7556 cycles for the two blocks of the data burst. A GSM slot is 577 microseconds in length and the MLSE can complete the 7556 clock cycles of processing in 378 microseconds with a 20 MHz processing clock or in less than a slot duration. Then for reception of back-to-back slots in a so-called multi-slot mode provided for in the GSM specifications, the MLSE of the present invention is completes the processing of a slot of data with substantial margin before the next slot of data arrives Table 3 summarizes the memory requirement for the preferred embodiment of the present invention. Column three shows that for the GSM example where N=58 bits and L=5, the total memory requirement is 2720 bits. This assumes typical word lengths for GSM of 16 bits for correlation parameters stored in memory Mem_cor 1135 and for branch metric parameters F(q,0) and F(q,1), and 22 bit word lengths for state metrics stored in memory Mem_j 1137.

Figure 16:
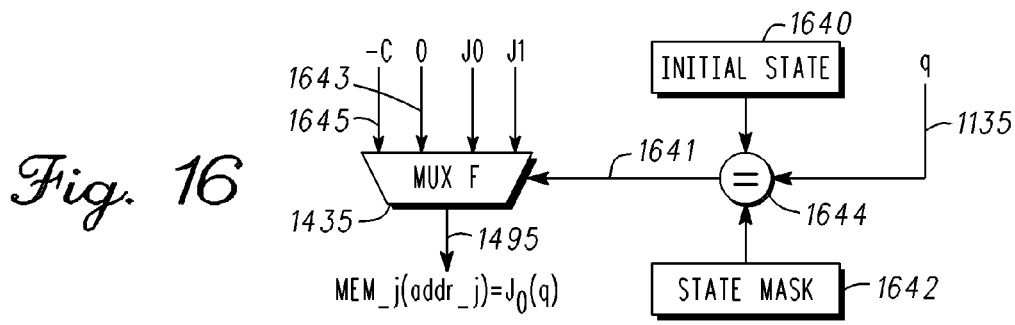
FIG. 16 describes modifications to the ALU of the preferred embodiment for incorporation of known initial state information in one embodiment.

As discussed above in FIG. 8, the MLSE performance can be improved, that is Bit Error Rate (BER) can be reduced if the possible paths through the trellis are limited to those beginning and ending at known valid states. The method of the invention for utilizing initial and final state information in an alternative embodiment to enhance Viterbi Algorithm performance is shown with the aid of FIGS. 16 and 17. The MLSE is the same as the preferred embodiment except for the modifications described in FIGS. 16 and 17. FIG. 16 shows modifications to the ALU that incorporate known information about the initial state into the Viterbi Algorithm during state metric initialization. Relative the previous embodiment this embodiment additionally includes in the ALU 1130 an Initial State Register 1640, an Initial State Mask 1642, a comparator 1644 which tests for equality of Initial State 1640 and current state q 1135 subject to the Initial State Mask 1642. This embodiment further includes lines to accept two new inputs for the multiplexer 1435 labeled Mux F from the preferred embodiment of FIG. 14. The two new inputs are a 24-bit constant –C 1645 and 24-bit value zero 1643. The Initial State register 1640 holds the known initial state of length L bits. As discussed above, the Initial-State Mask register 1642 contains a bit sequence of length L bits wherein a bit value 0 in the i-th bit position indicates that the symbol in the i-th bit position of the initial state register 1640 is a valid bit. A bit value 1 in the i-th bit position indicates an invalid or don't-care logic for the i-th bit position of the initial state register 1640. The combination of the Initial State and the Initial State Mask jointly define all valid initial states.

The configuration of FIG. 16 for the alternative embodiment applies only during stage n=0 of the trellis, corresponding to a state metric initialization phase, and the ALU operation is otherwise the same as the preferred embodiment during the forward trace phase of the Viterbi Algorithm. The FSM cycles through all $2^L$ state values q 1135 during trellis stage n=0. The value of the comparator output 1641, which is also the Mux F 1435 control signal is binary 0 if the current state value q is a valid initial state and is binary 1 otherwise. A control value 0 causes Mux F 1435 to select as input the value zero 1643 and a control value 1 causes Mux F 1435 to select as input the value –C 1645 which is a negative number with large magnitude. The Mux F 1435 output 1495 represents initial state metrics $J_n(q)=J_0(q)$ and is stored to state metric memory Mem_j at address addr_j specified by the FSM. Then, the valid initial states receive relatively high initial state metric values (zero) compared to invalid states which receive negative initial state metric values –C. The constant C has sufficiently large magnitude that the maximum likelihood path finally selected by the Viterbi Algorithm will always start on a valid state. The metric word size in the preferred embodiment for the GSM application is 24 bits and the branch metric word size is 16 bits. The constant C has value $2^{16}$. After the FSM cycles the ALU 1130 through the preceding initialization phase using the modifications of FIG. 16 to the preferred embodiment, the remaining ALU forward trace processing phase is identical to the preferred embodiment of FIG. 14. In Table 2, the initialization phase replaces the reset, and requires $2^L$ clock cycles to initialize the $2^L$ state metrics at stage n=0 of the trellis.

Figure 17:
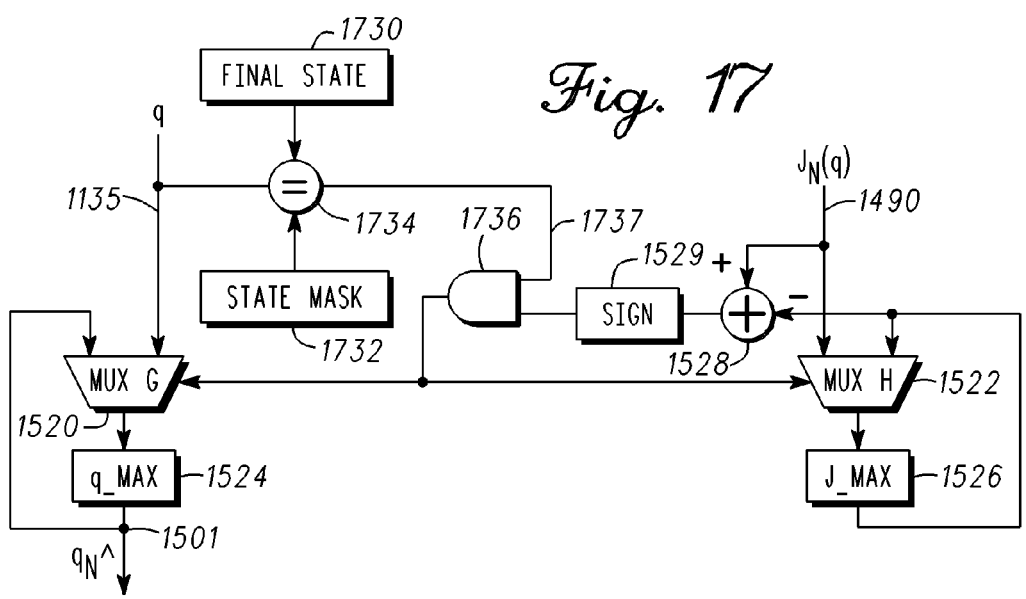
FIG. 17 describes modifications to the ALU of an embodiment for incorporation of known final state information.

FIG. 17 shows modifications to the metric comparator 1500 of FIG. 15 for an alternative embodiment that incorporates known information about the final state into the Viterbi Algorithm during final stage N of the trace forward operation. It is to be recalled that the metric comparator 1500 determines the final state $q_N\hat{}$ of the maximum likelihood path which serves as the initial state for Viterbi Algorithm backward trace operation. The alternative embodiment additionally includes in the metric comparator 1500 a Final State register 1730, a Final State Mask register 1732, a comparator 1734 which tests for equality of Final State 1730 and current state q 1135 subject to the Final State Mask 1522. The output 1537 of the comparator 1534 has binary value 0 if the masked equality holds, that is the current state q 1135 is a valid state. The alternative embodiment further includes a logical-and operation 1736 which has an output that controls the multiplexers 1520 and 1522 and has value 0 if and only if the sign operator 1529 output and comparator 1737 output both have zero value. The latch q_max 1524 latches the current state only if the state is a valid final state and its state metric is larger than the currently latched state metric value. As a consequence, at the end of final trellis stage N the latched value $q_N\hat{}$ in latch q_max is the state having the largest state metric among the set of all valid terminal states. In this way the alternative embodiment forces the Viterbi Algorithm to confine search for the maximum likelihood path to the set of all paths having a valid terminal state as well as a valid initial state, thereby enhancing the performance of the Viterbi Algorithm. Thereafter the backward trace operation is identical with that of the preferred embodiment.

As an example of usage prior initial or final state information in this embodiment, Table 4 summarizes the register contents indicating prior knowledge about initial and final states for both LHS data block and RHS data block of a data burst for the GSM example. In this example, channel memory L=5 and trellis length N=63 (58 data symbols+5 symbols extension to the known final state).

Figure 18:
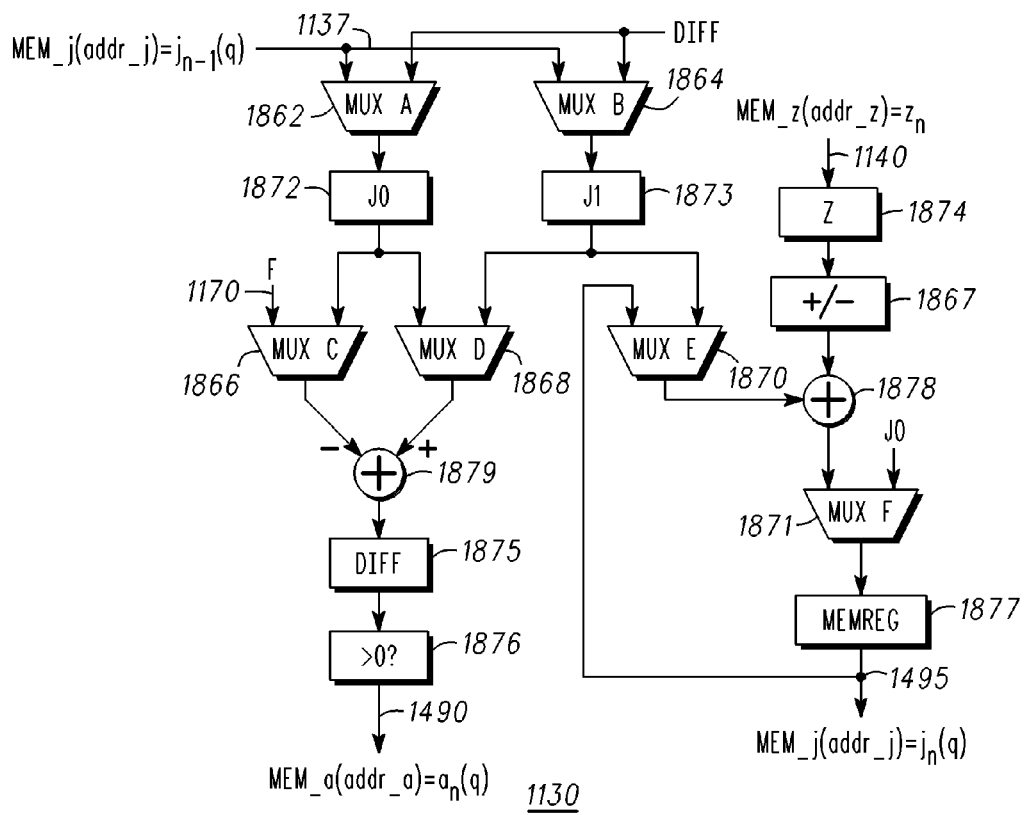
FIG. 18 describes an embodiment of the ALU for reduced computational complexity.

In the one embodiment the MLSE required only two cycles of the processing clock per state in the forward trace operation of the Viterbi Algorithm. However, the State Metric memory is required to support simultaneous read/write access which implies increased memory complexity such as dual port memory. This is because for each state as in the preferred embodiment there are two memory accesses for reading of predecessor state metrics, and one writing of current state metrics. In an another embodiment the MLSE requires three clock cycles but has the benefit of less complexity in the ALU 1130 and memory. An alternative ALU 1130 is shown in FIG. 18. In addition to the lesser number of components compared to the embodiment in FIG. 14, this embodiment does not require simultaneous read/write memory access to State Memory Mem_j 1137.

The ALU 1130 comprises data processing components including six multiplexers 1862, 1864, 1866, 1868, 1870, and 1871 labeled Mux A, Mux B, Mux C, Mux D, Mux E, and Mux F respectively, five latches 1872, 1873, 1874, 1875, 1877, labeled J0, J1, z, Diff, and Memreg respectively, two adders 1878 and 1879, a threshold tester 1876, and a sign inverter 1867. The adder 1878 computes as output the Mux D 1868 output minus the Mux C 1866 output. The adder means 1879 computes the sum of Mux E 1870 output and the output of sign inverter means 1867. The output of sign inverter means is set equal to the input if the MSB of state q is 1, and otherwise the output is the negative of the input. The threshold tester 1876 tests whether Diff is <0 and outputs a binary 0 if true and binary 1 otherwise.

In FIG. 18, the ALU 1130 provides for forward trace computation of the Viterbi algorithm in accordance with Equations 4 through the following signal processing steps. The FSM cycles the ALU 1130 from stage to stage n=1, 2, . . . , N of the trellis, and for each stage cycles through all states q in a Gray coded sequence, or a modified Gray code sequence as described above. In FIG. 18, at each state q of stage n, the ALU 1130 provides means for computation of the survivor bit an(q) according to Equations [4] under control of the FSM as follows:

Step A. Address addr_j is set for reading of memory Mem_j 1137 the storage location for the state metric $J_{n-1}(q\hat{}0)$ for predecessor state $q\hat{}0$ corresponding to predecessor bit 0.

Step B. Mux A 1862 selects input from memory Mem_j 1137. Latch J0 1872 receives stored value in Mem_j(addr_j). That is $J0=J_{n-1}(q\hat{}0)$.

Step C. Address addr_j is set for reading of memory Mem_j 1137 the storage location for the state metric $J_{n-1}(q\hat{}1)$ for predecessor state $q\hat{}2$ corresponding to predecessor bit 1.

Step D. Mux C 1866 selects as input the F-Generator output 1170, Mux D 1868 selects the output of J0 1872 as an input, and Mux A 1862 selects Diff as an input. Then, $J0=Diff=J0-F=J_{n-1}(q\hat{}0)-F$. As presently described the F-Generator control will be phased such that the F-Generator output F=F(q,0) at this step so that $J0=J_{n-1}(q\hat{}0)-F(q,0)$.

Mux E selects input from memory Mem_j 1137. Latch J1 1873 receives stored value in Mem_j(addr_j). That is $J1=J_{n-1}(q\hat{}1)$.

Step E. Mux C 1866 selects as input the F-Generator output 1170, Mux D 1868 selects the output of J1 1873, and Mux B 1864 selects Diff as an input. Then, $J1=Diff=J1-F=J_{n-1}(q\hat{}1)-F$. As presently described the F-Generator control will be phased such that the F-Generator output 1170 F=F(q,1) at this step so that $J1=J_{n-1}(q\hat{}1)-F(q,1)$.

Step F. Address addr_a is set for writing to trace memory Mem_a 1138 at the location for node (n,q) for stage n, state q. J0 and J1 do not update. Mux C 1866 selects the output of J0 1872 and Mux D 1868 selects the output of J1 1873. Then $Diff=J1-J0=J_{n-1}(q\hat{}1)-F(q,1)-[J_{n-1}(q\hat{}0)-F(q,0)]$, and the output of threshold tester means 1876 is the survivor bit $a_n(q)$ according to Equations [4]. Trace Memory Mem_a receives state metric $a_n(q)$.

Step G. Mux F 1871 selects input J0. Then Memreg $1877=J0=J_{n-1}(q\hat{}0)-F(q,0)$.

Step H. Address addr_obs of Observation Memory Mem_obs 1136 is set to read observation $z_n$. Mux F 1871 selects as input the output of adder means 1878. Depending on the bit value of an(q) the FSM will configure the ALU in one of two modes as follows. If $a_n(q)=0$, Mux E 1870 selects as input the output of latch Memreg 1877, so that Memreg=Memreg+/$-z_n=J_{n-1}(q\hat{}0)-F(q,0)+/-z_n$. If $a_n(q)=1$, Mux E 1870 selects as input the output of latch J1 1873, so that Memreg $=J1+/-z_n=J_{n-1}(q\hat{}1)-F(q,1)+/-z_n$. The sign of $z_n$, determined by sign inverter means 167, is set negative if the MSB of state q is 0 and set positive otherwise. Latch Memreg 1877 then contains state metric $J_n(q)$.

Step I. Address addr_j of State Metric Memory Mem_j 1495 is set for writing current state metric for state q at stage n of the trellis.

Step J. FSM increments state variable q.

Step K. The current state metric is written to memory, that is, data storage element Memj(addr_j) receives value $J_n(q)$ in latch Memreg 1495.

The above processing may be implemented in VLSI hardware wherein multiple steps are performed in parallel under FSM control and data processing clock. Table 5 summarizes the parallel processing steps and phasing of the processing clock for the ALU 1130 and F-Generator 1120. Each state q at each trellis stage n requires computation of survivor bit an(q), state metric $J_n(q)$, and supporting branch metric parameters F(q,0) and F(q,1). After initialization, the signal processing steps of the ALU 1130 and F-Generator 1120 are both performed in parallel in three clock cycles per state. The first row of Table 5 indicates the processing clock phasing or modulus value 0, 1, or 2. The second row indicates at which clock phase each ALU 1130 processing step is performed. The third row indicates at which clock phase each F-Generator 1120 processing step is performed. In Table 5, the relative timing of the processing provides at F-Generator 1120 output 1170 the values of computed branch metric parameter values F(q,0) and F(q,1) precisely when needed by the ALU processing. Further there is no requirement for simultaneous read/write access to State Metric Memory Memj 1137 as in the preferred embodiment as the two read accesses for prior state metrics are performed at Step B at mod 1 and Step D at mod 2 and the one write access is performed at Step K at mod 0.

It will be apparent to a person skilled in the art that the MLSE of the present invention can be configured in an embodiment to support a large class of known soft decision generators that depend only on the partial path metrics $J_n^0(q)$ and $J_n^1(q)$ as defined by Ungerboeck in Equations [1] and [3]. The ALUs described above need only be modified to provide computed values of path metric variables J0 and J1, channel autocorrelation constant so, and the current state n to the soft decision generator. To see this let J0 and J1 be represented by the notation $P_n^0(q)$ and $P_n^1(q)$ respectively to indicate the dependence on state q and trellis stage n. Then at the n-th stage, the ALU makes available to the soft decision generator the metrics $P_n^0(q)$ and $P_n^1(q)$. As described earlier the branch metrics defined for the present invention are less than the branch metrics defined by Ungerboeck by an amount so because of the simplification of the branch metric computation of the present invention in transition from Equations [3] to Equations [4]. Because the partial path metrics are additive with respect to the constituent branch metrics the pair of partial path metrics J0 and J1 or alternatively $P_n^0(q)$ and $P_n^1(q)$ are smaller than the corresponding partial path metrics of Ungerboeck by an amount $nxs_0$. That is, $P_n^0(q)=J_n^0(q)-nxs_0$, and $P_n^1(q)=J_n^1(q)-nxs_0$. For some soft decision generators, the soft decision generators require only values J0 and J1. As an example the soft decision generator of U.S. Pat. No. 5,502,735 calculates a soft decision for the n-th transmitted data symbol by $b_n$=absolute value of $[\max\{J_n^0(q)\}-\max\{J_n^1(q)\}]$, where the maximum is taken over all states q. By substitution, $b_n$=absolute value of $[\max\{P_n^0(q)\}-\max\{P_n^1(q)\}]$ so that only values $P_n^0(q)$ and $P_n^1(q)$, or alternatively J0 and J1 are needed from the MLSE by the soft decision generator.

Figure 19:
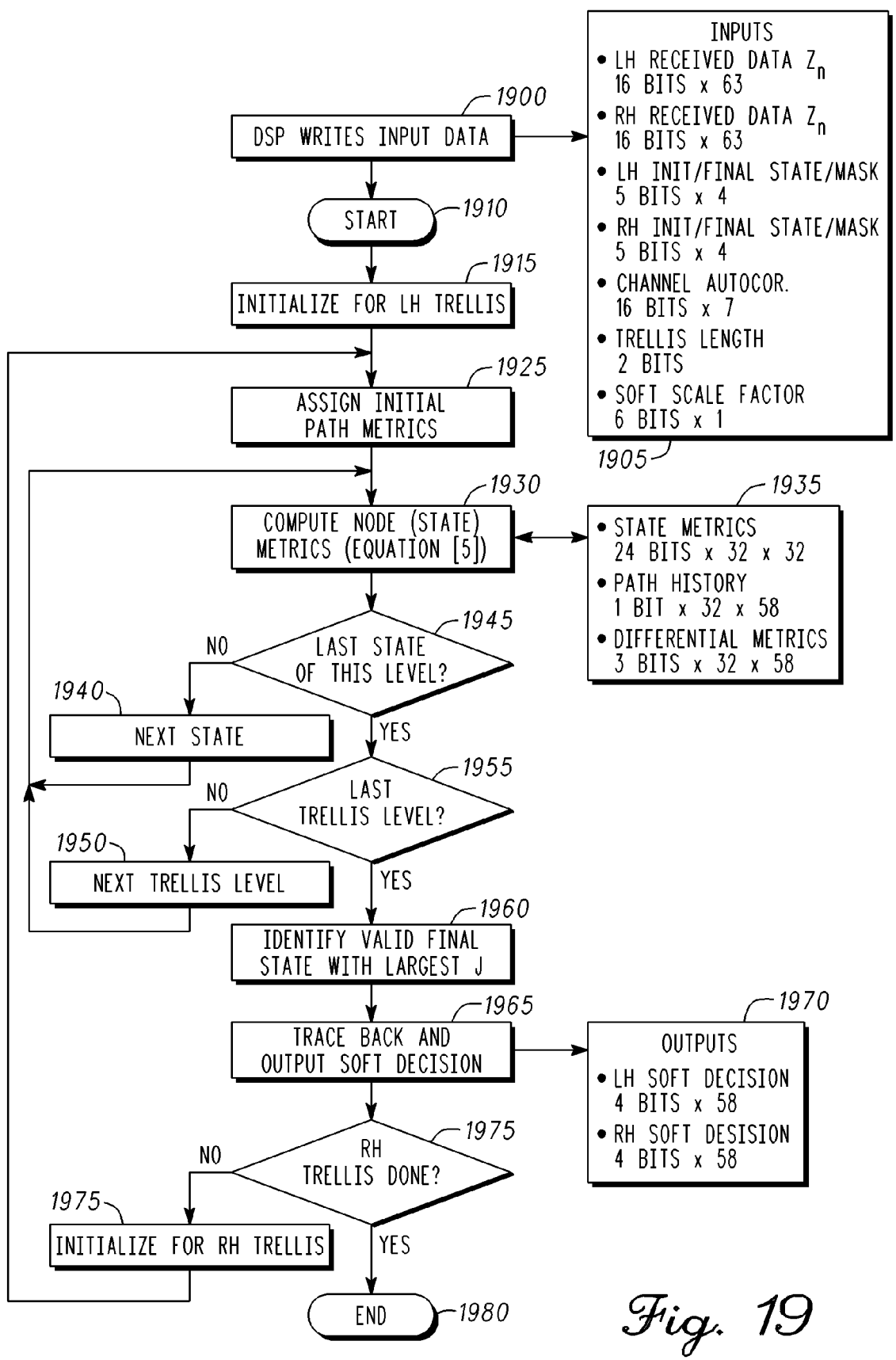
FIG. 19 shows a flow chart for the Viterbi Algorithm used by one embodiment of the present invention which includes soft decision making.

FIG. 19 shows a flow chart for one embodiment of the present invention which incorporates soft decision making. Except where noted, this flow chart is also applicable for embodiments which do not use soft decision making. A data packet or burst, such as the GSM data burst in FIG. 1 is received, and before the processing of the RHS 30 and LHS 20 data is begun, parameters are input to memory and registers by a DSP in acts 1900 and 1905. Specifically, the RH and LD data $z_n$ for the 58 received bits, along with 5 tail and dummy bits which correspond to the final and initial states, 63 in total, at an accuracy of 16 bits, are stored. The initial and final state and mask registers are loaded, as are the channel autocorrelation $s_x$ bits. The trellis length and, if appropriate, soft scale factors are loaded.

The processing starts, act 1910, and the LH trellis is initialized. Initial states are initialized to 0 or –C as described above, act 1925. The branch metrics are computed as per Equation [5] act 1930, and the state metrics and survivor bits are stored 1935. Further, the difference between the partial path metrics are stored if soft decision making is supported. The processing continues through all the nodes at that stage of the trellis, 1945, 1940, and 1930. When the last state at that stage of the trellis is reached, the trellis stage is incremented in act 1950. At the end of the trellis, a yes to question 1955, the final valid state with the largest chance of occurrence is selected in act 1960. At that point, that is the final state, and the trace back can occur as described above, act 1965. When trace back finishes, the process repeats for the RH data. When processing is complete, the soft decision bits, if computed, are output, act 1970.

Figure 20:
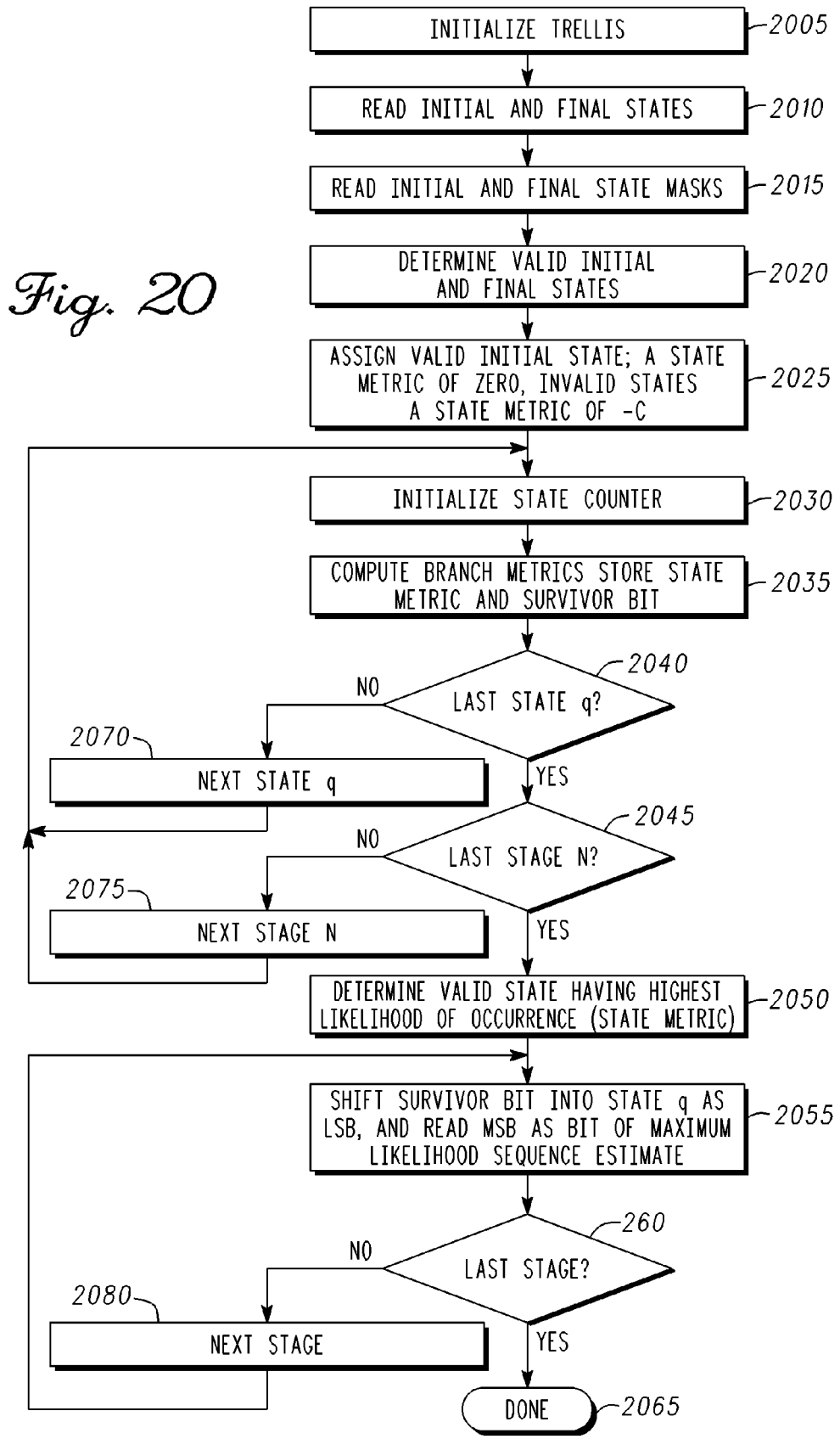
FIG. 20 shows a flow chart for one embodiment of the present invention which incorporates knowledge about the initial and final states.

FIG. 20 is a flow chart of one embodiment of the present invention which incorporates knowledge of initial and final states of the trellis. As a further refinement, the validity of initial and final states may also be included. A system may know that certain initial and final states are invalid. For example, in the GSM data burst 5 as shown in FIG. 1, the power ramp up and ramp down may affect the validity of the dummy bits 22 and 32, as well as one or more of the tail bits 25 and 35. For instance, if L=5, the initial state for the LHS may be 11000 where the ones are dummy bits 22 and 32, and the zeros are tail bits 25 and 35. The ones and at least one zero may be invalid due to the power up since the autocorrelation factor $s_x$ were determined at full power.

The trellis is initialized in act 2005. The initial and final states are read, 2010, and the initial and final state masks are read, 2015. From this, valid initial and final state are determined. It is obvious to one skilled in the art that the steps listed herein may be done in a different order. As an example, the valid final states may be determined later.

The valid initial and final states are determined in act 2020 as shown by the following examples. If L=5 and the initial state register contains 10010 and the initial state mask register contains 00000, then the only valid initial state is 10010. This is because the mask register indicates that all bits of the initial state register are valid. Alternately, if the initial state register contains 00000 and the initial state mask register contains 00011, then the four states matching 000xx where x denotes a don't care condition, that is either 0 or 1, are valid initial states. Then there are four valid initial states 00000, 00001, 00010, and 00011.

The valid initial states are assigned an initial state metric of 0, and the invalid state are assigned an initial state metric of –C in act 2025 as described above. The state counter is initialized, 2030, and the branch metrics are computed, and the state metric and survivor bit stored 2035. Each state q of the stage is cycled through, 2040, 2070, and when the last state is reached 2040, the processing move to the next stage N, 2040. When the last stage is reached, 2045, the forward trace is complete. The states q may be cycled through in a Gray code fashion, some of the state may be cycled through in a Gray code fashion while some are not. The state transitions may be limited to one bit changing between consecutive state, or they may be limited to two bits changing between consecutive states. Alternately, a limit of some other number of bits may be imposed, such as 3 or 4 bits. Alternately, a more conventional method of counting, such as 0000, 0001, 0010, 0011, 0100, or any other type of sequencing may be used.

Next, the highest state metric of all the valid states is determined, 2050. This may be incorporated with the comparisons of the branch metrics for each node at the final stage. The trace back then begins, as the survivor bit associated with the state metric found in act 2050 is shifted into the final state at stage N as the LSB, 2055, resulting in a new state at stage N−1. The MSB that is shifted out is the last bit in the maximum likelihood sequence estimate. This continues in act 2060 and 280 until the last stage of the traceback, which is the first stage of the forward trace, is reached.

If knowledge about the validity of the initial and final states is not known, that is the initial and final state masks are not known, the actual initial and final states may be considered the only valid states.

Some of the following references were cited above, and all are incorporated by reference for all allowable purposes.
[1] IEEE Transactions on Information Theory, vol. IT-18, pp. 363-378, G. D. Forney, "Maximum-likelihood sequence estimation of digital sequences in the presence of intersymbol interference";
[2] IEEE Transactions on Communications, vol. COM-22, No. 5, May 1974, pp. 624-636, Ungerboeck, "Adaptive maximum likelihood receiver for carrier-modulated data-transmission systems; Proceedings of GLOBECOM'89, pp. 47.1.1-47.1.7, November 1989.
[3] J. Hagenauer and P. Hoeher, "A Viterbi Algorithm with soft-decision outputs and its applications"; and
[4] Global System for Mobile Communications (GSM), Digital cellular telecommunications system, European Telecommunication Standard Institute (ETSI).

While the description above provides a full and complete disclosure of the preferred embodiments of the present invention, various modifications, alternate constructions, and equivalents will be obvious to those with skill in the art. For example, any memory referred to herein may be an on chip memory, memory on another chip, SRAM, DRAM, flip-flops, ROM, flash E-PROM, flash EE-PROM, or the like. Thus, the scope of the present invention is limited solely by the metes and bounds of the appended claims.

What is claimed is:

1. A maximum likelihood sequence estimator (MLSE) for estimating a possible sequence of transmitted symbols received over a dispersive communication channel, wherein a trellis of states and trellis paths are associated with the possible sequence of transmitted symbols, said MLSE comprising:

a plurality of data sources relating respectively to state transition probabilities and observed values of received data symbols;

means for calculating and storing a likelihood metric and a survivor bit for each state of the trellis using values from said plurality of data sources, comprising means for computing branch metrics for the trellis by setting a first portion of the branch metrics equal to a coefficient which models an autocorrelation of an impulse response of a channel and setting a second portion of the branch metrics equal to a sum or difference of a prior value of a branch metric and a coefficient which models an autocorrelation of an impulse response of a channel;

means for determination of a final state on a maximum likelihood path in the trellis; and means for calculating a maximum likelihood sequence of transmitted symbols in a backward trace through the trellis using said stored survivor bits.

2. The MLSE of claim 1 further comprising means for computing supporting branch metric parameters, wherein said branch metric parameters are computed recursively for a Gray coded sequence of states, wherein said recursive computation requires only a single addition operation per branch metric parameter per state, thereby substantially reducing a number of computational steps required per branch metric parameter calculation.

3. The MLSE of claim 2 wherein said branch metric parameters are pre-computed and stored in a data memory prior to a forward trace through the trellis, wherein said stored branch metric parameters are retrieved from said data memory as needed to support state metric calculations subsequently performed in said forward trace through the trellis.

4. The MLSE of claim 2 wherein said branch metric parameters are computed in real time as needed for state metric calculations, and wherein sequencing of said states is performed according to a Gray code for both branch metric calculations and state metric calculations, thereby achieving a substantial savings in a data storage requirement.

5. The MLSE of claim 2 further including means to provide sufficient data for a class of soft decision generators that are dependent only on partial path metrics.

6. The MLSE of claim 1 further including means to utilize prior knowledge about the initial trellis state to enhance MLSE estimation performance of said transmitted sequence, said performance enhancing means including:

an initial state register paired with an initial state mask register, wherein said pair of registers define a set of valid initial states representing prior knowledge about the transmitted sequence; and means for initialization of trellis state metrics such that an MLSE Viterbi algorithm selection of the maximum likelihood path in the trellis is confined only to paths having a valid initial state.

7. A maximum likelihood sequence estimator (MLSE) for estimating a possible sequence of transmitted symbols received over a dispersive communication channel, wherein a trellis of states and trellis paths are associated with the possible sequence of transmitted symbols, said MLSE comprising:

a plurality of data sources relating respectively to state transition probabilities and observed values of received data symbols;

means for calculating and storing a likelihood metric and a survivor bit for each state of the trellis using values from said data sources;

means for determination of a final state on a maximum likelihood path in the trellis;

means for calculating a maximum likelihood sequence of transmitted symbols in a backward trace through the trellis using said stored survivor bits; and means to utilize prior knowledge about an initial trellis state to enhance MLSE estimation performance of said transmitted sequence, said performance enhancing means including:

a final state register paired with a final state mask register, wherein said register pair define a set of valid final states representing prior knowledge about the transmitted sequence; and means for selection of a final state of the trellis on the maximum likelihood path such that an MLSE Viterbi algorithm selection of the maximum likelihood path in the trellis is confined only to paths having a valid final state.

8. The MLSE of claim 7 comprising a comparator configured to test for equality of an output of a final state register and a current state in accordance with an output of the final state mask register.

9. The MLSE of claim 8 comprising a multiplexer for selecting the current state or a prior state in accordance with the test for equality.

10. The MLSE of claim 9 comprising a latch for storing the current state in accordance with the test for equality.

11. The MLSE of claim 7 comprising means to utilize prior knowledge about the initial trellis state to enhance MLSE estimation performance of said transmitted sequence, said performance enhancing means comprising:
an initial state register paired with an initial state mask register, wherein said pair of registers define a set of valid initial states representing prior knowledge about the transmitted sequence; and
means for initialization of trellis state metrics such that the MLSE Viterbi algorithm selection of the maximum likelihood path in the trellis is confined only to paths having a valid initial state.

12. A method of computing a maximum likelihood sequence estimate comprising:
providing an initial state;
providing an initial state mask comprising a plurality of bits having either a first polarity or a second polarity; and
determining a plurality of valid initial states by:
starting with the initial state;
substituting a don't care for each bit in the initial state which has a corresponding bit having a first state in the initial state mask; and
determining the maximum likelihood sequence estimate based on the plurality of valid initial states,
wherein the valid initial states are defined by either a one or a zero in the bit position having a don't care, and the same bit as the initial state in the other positions.

13. The method of claim 12 wherein the initial state mask is determined by power up characteristics of a transmitter.

14. The method of claim 13 wherein the transmitter is compliant with the Global System for Mobile Communications standard.

15. The method of claim 12 comprising testing for equality of the initial state and a current state in accordance with the initial state mask.

16. The method of claim 15 comprising controlling a multiplexer in accordance with the testing for equality of the initial state to select an initial metric value associated with a valid initial state or an initial metric value associated with an invalid initial state.

17. The method of claim 12 comprising associating initial metric values with the valid initial states and invalid initial states, wherein the initial metric values associated with the valid initial states are greater in magnitude than the initial metric values associated with the invalid initial states.

18. The method of claim 17 wherein the initial metric values associated with the invalid initial states are negative values.

19. The method of claim 12 comprising:
providing final state data;
providing a final state mask;
determining a plurality of valid final states in accordance with the final state data and the final state mask; and
selecting path matrices corresponding to a valid initial state and a valid final state.

20. A method of computing a maximum likelihood sequence estimate comprising:
providing a trellis comprising a plurality of nodes corresponding to a plurality of states at a plurality of stages;
computing branch metrics for the trellis by setting a first portion of the branch metrics equal to a coefficient which models an autocorrelation of an impulse response of a channel and setting a second portion of the branch metrics equal to a sum or difference of a prior value of a branch metric and a coefficient which models an autocorrelation of an impulse response of a channel; and
determining the maximum likelihood sequence estimate based on the branch metrics.

21. The method of claim 20 wherein a present state is incremented to a next state by changing only one bit in accordance with a Gray code.

* * * * *